US007266340B2

(12) United States Patent
Bresciani

(10) Patent No.: US 7,266,340 B2
(45) Date of Patent: Sep. 4, 2007

(54) SYSTEMS, METHODS AND COMPUTER PROGRAM PRODUCTS FOR STANDARDIZING EXPERT-DRIVEN ASSESSMENTS

(75) Inventor: Marilee J. Bresciani, College Station, TX (US)

(73) Assignee: North Carolina State University, Raleigh, NC (US)

( * ) Notice: Subject to any disclaimer, the term of this patent is extended or adjusted under 35 U.S.C. 154(b) by 14 days.

(21) Appl. No.: 10/993,321

(22) Filed: Nov. 19, 2004

(65) Prior Publication Data
US 2005/0123891 A1 Jun. 9, 2005

Related U.S. Application Data

(60) Provisional application No. 60/528,274, filed on Dec. 9, 2003.

(51) Int. Cl.
*G09B 3/00* (2006.01)
(52) U.S. Cl. ...................... 434/350; 434/322
(58) Field of Classification Search ............ 434/307 R, 434/118, 365, 350, 322
See application file for complete search history.

(56) References Cited

U.S. PATENT DOCUMENTS

| 5,879,165 | A | | 3/1999 | Brunkow et al. |
| 6,561,812 | B1 | * | 5/2003 | Burmester et al. .......... 434/365 |
| 6,632,158 | B1 | | 10/2003 | Nashner |
| 6,735,570 | B1 | * | 5/2004 | Lacy et al. ................... 705/7 |
| 6,916,180 | B1 | * | 7/2005 | Price et al. ................. 434/219 |
| 2002/0194100 | A1 | * | 12/2002 | Choban et al. ............... 705/36 |
| 2004/0110119 | A1 | * | 6/2004 | Riconda et al. ............. 434/350 |
| 2004/0157201 | A1 | * | 8/2004 | Hollingsworth et al. ..... 434/350 |
| 2005/0086257 | A1 | * | 4/2005 | Wright .................... 707/103 R |
| 2006/0014129 | A1 | * | 1/2006 | Coleman et al. ............ 434/322 |

OTHER PUBLICATIONS

NuVentive, *TracDat Department Setup Information*, 2001.
NuVentive, *TracDat Manual*, 2001.
NuVentive, *TracDat Unit Setup Information*, 2001.
NuVentive, *TracDat Institution Setup Information*, 2001.
NuVentive, *TracDat Product Information and FAQs*, retrieved Nov. 18, 2004 from http://www.nuventive.com/html/tracdat.htm.

* cited by examiner

*Primary Examiner*—Robert E. Pezzuto
*Assistant Examiner*—Cameron Saadat
(74) *Attorney, Agent, or Firm*—Myers Bigel Sibley & Sajovec, P.A.

(57) ABSTRACT

Assessment is standardized by linking project objectives to normalized assessment outcomes using a common set of keywords. Specifically, assessment methodologies are captured as text and codes, and assessment observations are captured as text and rankings. The rankings are normalized and assessment reports are generated from the normalized rankings and codes. Educational assessment and/or project assessment may thereby be standardized.

48 Claims, 17 Drawing Sheets

| Fig. 5A | Fig. 5B | Fig. 5C | Fig. 5F | Fig. 5I |
|---------|---------|---------|---------|---------|
|         |         | Fig. 5D | Fig. 5G | Fig. 5J |
|         |         | Fig. 5E | Fig. 5H | Fig. 5K |

| Course Number | Course Name | Course Description | Link to course syllabus |
|---|---|---|---|

This section should be duplicate for eithe

FIG. 5D

| Activity Number | Activity Name | Activity Description | Link to Activity plan |
|---|---|---|---|
| | | | |

Implementation Plan (yes, no)

Implementation Steps (many to many)

Who is Responsible

Date of Implementation

Cost of Plan

Observation Code
Observation Description (many to many)
Who Made Observation
Criteria Rank Choice
Observation Type (strength, weakness, or neutral)
Date of Observation
Notes
Date of Notes
Reminder for next time you assess this outcome
Email Reminder
Link to related reports
Other links Tool Choice
Method Choice Decision Code
Decision Made (many to many)
Date of Decision Made
Notes
Date of Notes
Descriptor
Email Reminder

| |
|---|
| Decision Code |
| Decision Made (many to many) |
| Date of Decision Made |
| Notes |
| Date of Notes |
| Decision Descriptor 1 |
| Email Reminder |

FIG. 5K

| |
|---|
| Decision Code |
| Decision Made (many to many) |
| Date of Decision Made |
| Notes |
| Date of Notes |
| Decision Descriptor 1 |
| Email Reminder |

FIG. 5J

Reporting Process Overview

| Drop down box code words allow for reports to be sorted and counted - - the detailed data linked to the code words can still be reported if necessary. However, the code words can be summarized and reported more easily. | 610 |

↓

| Summaries of types of outcomes, types of evaluation methods, types of assessment tools, types of observaions, and types of decisions made can be mined using a text data miner and summarized in graphs. | 620 |

↓

| In a crosswalk table, each drop down word is assigned a numerical code. Through ordinal data analysis, the numbers are statistically manipulated to present descriptive summaries of findings across programs, departments, colleges, institutions, states, etc. | 630 |

↓

| Through the faculty member assigning a criteria ranking number to his/her observation, the group ranking of reports can also be compiled. | 640 |

FIG. 6

SYSTEMS, METHODS AND COMPUTER PROGRAM PRODUCTS FOR STANDARDIZING EXPERT-DRIVEN ASSESSMENTS

CROSS REFERENCE TO RELATED APPLICATION

This application claims the benefit of provisional Application No. 60/528,274, filed Dec. 9, 2003, entitled Systems, Methods and Computer Program Products for Standardizing Expert-Driven Assessments, the disclosure of which is hereby incorporated herein by reference in its entirety as if set forth fully herein.

FIELD OF THE INVENTION

This invention relates to data processing systems, methods and computer program products, and more specifically to assessment systems, methods and computer program products.

BACKGROUND OF THE INVENTION

Accountability demands may be increasingly placed on educational and other institutions. However, many proposals for monitoring quality education brought forward by legislative bodies and/or others across the country may not provide a true indicator of quality. For example, a first year retention rate, which is often a factor in the quality education discussion, does not necessarily tell much about the genuine quality of the learning that takes place at an institution. Nonetheless, indicators such as retention rates, graduation rates, student-to-faculty ratios and percentage of alumni giving have emerged as measures of higher education performance for many reasons, including the fact that the data can be readily gathered and merged into statistical equations that result in quality rankings and funding formula calculations. The result of some such calculations may distort assessment of educational quality.

SUMMARY OF THE INVENTION

Some embodiments of the present invention provide systems, methods and/or computer program products that can be used to standardize expert-driven educational assessment. More specifically, in some embodiments, assessment methodologies may be captured in a computer system as free-form text and sets of predefined codes, such as keywords, based on an assessment methodology that is generated by the expert who is providing the education, such as a faculty member, a program administrator and/or an activity administrator. Observations are then captured for various assessments of the course, program and/or activity using free-form text and rankings that are generated by the faculty member, program administrator or activity administrator. The observations and rankings may be referred to herein as a "rubric".

The rankings are normalized to provide standardized rankings, which also may be referred to herein as "cross-walks". The predefined codes (e.g., keywords) that are generated may be used to identify common areas of measurement across courses, activities and programs, and may also be used to roll up statistics that are useful for measurement at the department, college, accrediting agency, university, state system, regional accreditation and/or federal government level. Moreover, the normalized rankings may be used to provide statistical reports at any one of these and/or other levels that may be normalized across courses, departments, colleges, universities, states and/or regions.

In some embodiments of the present invention, education assessment observations are captured by observing the outcomes of education delivery in terms of the educational assessment observations. The educational assessment reports are then generated from the outcomes that are observed, the normalized rankings and the codes. In other embodiments, educational assessment methodologies are captured by a plurality of educational assessment institutions as text and a plurality of common codes that are used by the plurality of educational assessment institutions. These educational assessment institutions may include at least one education delivery institution and at least one government institution. Reports may then be generated for the plurality of educational assessment institutions from the normalized rankings and the codes. In still other embodiments, educational assessment observations are captured as text, rankings and at least some of the common codes that are used by the plurality of educational assessment institutions. In yet other embodiments, educational assessment plans also are generated from the normalized ranking and codes.

Accordingly, some embodiments of the present invention can link educational objectives to normalized assessment outcomes using a common set of keywords. Educational assessment reports and/or plans may then be generated from the educational objectives that are linked to the normalized assessment outcomes using the common set of keywords. Some embodiments of the present invention can thereby collect data from an assessment process of a program, course and/or activity, and store the assessment information in a manner that links the data to department, division/college, institutions, state and/or federal goals. The data then can be reported in a manner that allows the detailed text data to be quickly summarized for use among higher level decision makers.

Embodiments of the invention have been described above in connection with educational assessments by educational institutions. However, other embodiments of the present invention may be utilized in connection with assessment of a project at a project assessment institution. Thus, other embodiments of the present invention can standardize project assessment by linking project objectives to normalized assessment outcomes using a common set of keywords. Project assessment methodologies may be captured as text and codes. Project assessment observations may be captured as text and rankings. The rankings may be normalized, and project assessment reports may be generated from the normalized rankings and codes. The project assessment institutions can include at least one project delivery institution and at least one project monitoring institution. The project assessment observations may be captured as text and rankings, and the rankings may be normalized in response to input from a project expert who delivers a project that is related to the text and rankings.

It will be understood that embodiments of the present invention have been described above primarily with respect to methods of standardizing educational assessments and project assessments. However, analogous systems and computer program products also may be provided.

BRIEF DESCRIPTION OF THE DRAWINGS

FIG. 6 is a flowchart of operations that may be performed to use normalized rankings and codes to generate assessment reports according to various embodiments of the present invention.

DETAILED DESCRIPTION

Figure 1:
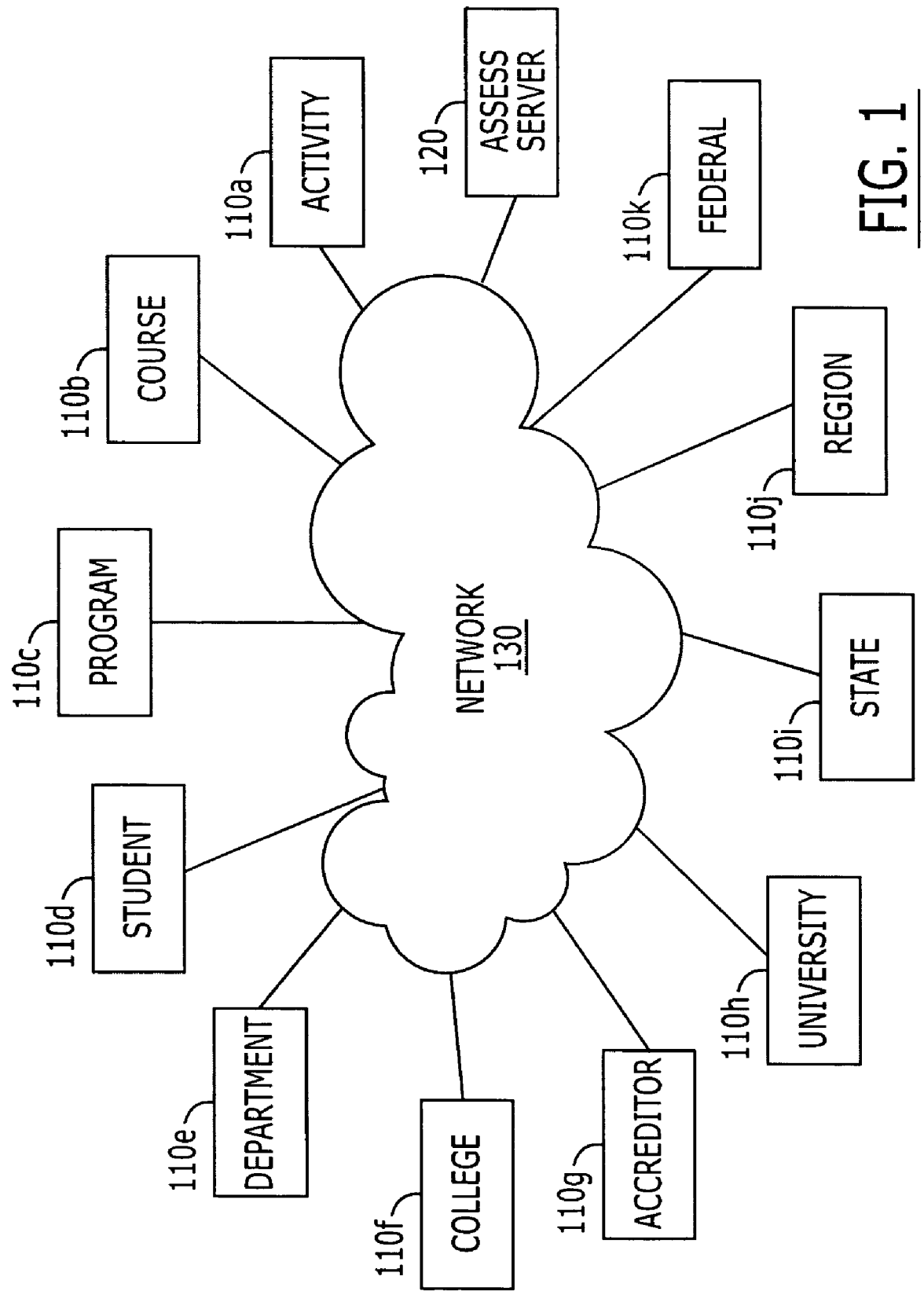
FIG. 1 is a block diagram of systems, methods and/or computer program products for standardizing expert-driven assessment according to various embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures. As used herein the term "and/or" includes any and all combinations of one or more of the associated listed items and may be abbreviated by "/".

The present invention is described below with reference to block diagrams and/or flowchart illustrations of methods, apparatus (systems) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a block diagram of systems, methods and/or computer program products for standardizing expert-driven educational assessment according to various embodiments of the present invention. As shown in FIG. 1, a plurality of user terminals 110a-110k may be used by an activity coordinator, course faculty member, program administrator, student, department member, college accreditor organization member, university, state, regional or federal overseer and/or others involved in assessment, to provide input to and/or obtain reports from a server 120, referred to herein as an "assess" server. It will be understood by those having skill in the art that multiple numbers of each type of user terminal 110a-110k may be provided, and that each user terminal 110a-110k may be embodied as a computer workstation, including one or more personal, application, enterprise, pervasive and/or embedded computer systems that may themselves be interconnected by one or more public and/or private wired and/or wireless networks, including the Internet. Moreover, the user terminals 110a-110k may be connected to the assess server 120 by a network 130, which may be one or more public and/or private, wired and/or wireless networks, including the Internet. In some embodiments, network 130, is the Internet, and communication among the user terminals 110a-110k and the assess server 120 may be performed using browser functions.

It will also be understood that, in other embodiments of the present invention, embodiments of FIG. 1 may be used for expert-driven assessment for non-educational institutions. Thus, for example, embodiments of the present invention may be used to standardize quality control assessment in a large company. In these embodiments, the user terminals 110a-110d may be used by a quality control coordinator, manufacturing coordinator and manufacturing workers for a given manufacturing line or product, and the user terminals for the department, college, accreditor, university, state, region and/or federal agency may correspond, for example, to user terminals that are used by a department, division, company and parent company in a large corporate organization, to allow standardized quality assessments to be obtained. Thus, a plurality of project assessment institutions can include at least one project delivery institution and at least one project monitoring institution. Finally, it will be understood that although educational institutions are described herein primarily with respect to college or university level education, embodiments of the invention may be used with grades K-12, as well.

Figure 2:
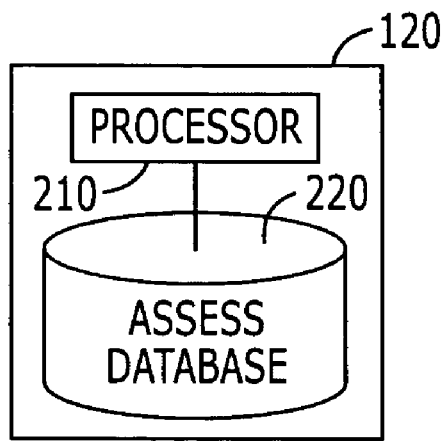
FIG. 2 is a block diagram of an assessment server according to various embodiments of the present invention.

FIG. 2 is a block diagram of an assess server, such as the assess server 120 of FIG. 1, according to various embodiments of the present invention. As shown in FIG. 2, the assess server includes a processor 210 and an assess database 220. The processor may be one or more personal, application, enterprise, pervasive and/or embedded computer systems that may be interconnected by a public and/or private wired and/or wireless network including the Internet. The processor 210 may run one or more database servers, such as well known Oracle or SQL servers, and a Web server that may be used for communication with the user terminals 110a-110k. The processor 210 may also run SAS DAP, SAS Data Warehousing, SAS Text Miner, SAS Enterprise Miner and/or other conventional data warehousing and/or data mining programs. The assess database 220 may be one or more Oracle and/or SQL databases and, in some embodiments, may be a relational database. The assess database 220 may be a centralized database and/or may be at least partially a distributed database.

Figure 3:
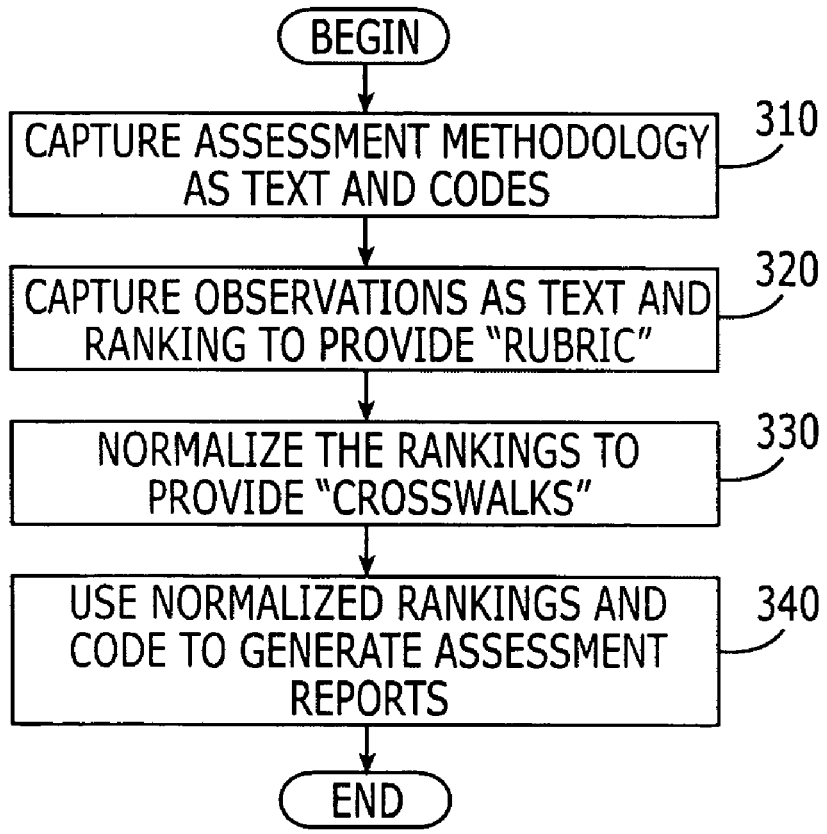
FIG. 3 is a flowchart of operations that may be performed to standardize assessment according to various embodiments of the present invention.

FIG. 3 is a flowchart of operations that may be performed by a server such as the assess server 120, according to various embodiments of the present invention. As shown in FIG. 3, at Block 310, assessment methodologies are captured using free-form text and codes, such as keywords, that are entered by a program administrator, a course faculty member, an activity administrator and/or other individuals who are involved with education, including students. Detailed screen shots for capturing the assessment methodology and database layouts for storing the assessment methodology will be described below. In general, however, the assessment methodology may be captured as free-form text, but also may be categorized using a plurality of codes which are, in some embodiments, keywords that describe the assessment methodology, and which may be governed by a predefined set of keywords, so as to promote uniformity of the assessment methodology that is captured. The codes or keywords may be set up initially by an assessment program administrator, and addition of keywords or codes may be allowed as an assessment program is implemented. The codes allow reporting to be performed at many levels, as will be described in detail below. The codes, such as keywords, also will be referred to herein as "code words".

Referring to Block 320, observations of a course faculty member, program administrator and/or activity administrator also may be captured as text and rankings. The text may be provided to capture various observations to be assessed, and the rankings may be provided by the individual to provide a standard for measuring the observation. It will be understood that these observations may be defined by the faculty member, program administrator and/or activity administrator, and the rankings also may be defined by the faculty member, program administrator and/or activity administrator using a scale that is defined by the faculty and/or administrator. The observations and rankings may be collectively referred to herein as a "rubric". Examples will be provided below.

Still referring to FIG. 3, at Block 330, the rankings are normalized so that measurements may be taken across courses, departments, institutions, universities, states, regions or the entire country, on a normalized scale. These normalized rankings may be referred to herein as "crosswalks". Many examples will be provided below. Outcomes of educational delivery are then observed in terms of the educational assessment observations (text, rankings and the normalized rankings). Finally, at Block 340, the normalized rankings and codes are used to generate assessment reports that can provide normalized data based on expert-driven assessments that may be used for assessment at the course, program, department, college, accreditation association, state government, federal government and/or other levels. These reports will be described in detail below.

Accordingly, some embodiments of the present invention can be used to collect data from the assessment process, store the assessment data in a manner that links the data to department, division, college, institution, state, federal and/or other goals, and then report the data out in a manner that allows the detailed text data to be summarized for use among higher level decision makers. Embodiments of the present invention can also allow faculty and administrators to document their course and program evaluation work in a manner that they are able to link their outcomes, findings and decisions made to institutional, division, college, state, accrediting agency and/or federal learning principles and/or values. The assessment data that is entered can be rolled up to higher level values, and summarized in easy to understand charts and/or graphs, for high level decision makers to use to form decisions.

Figure 4:
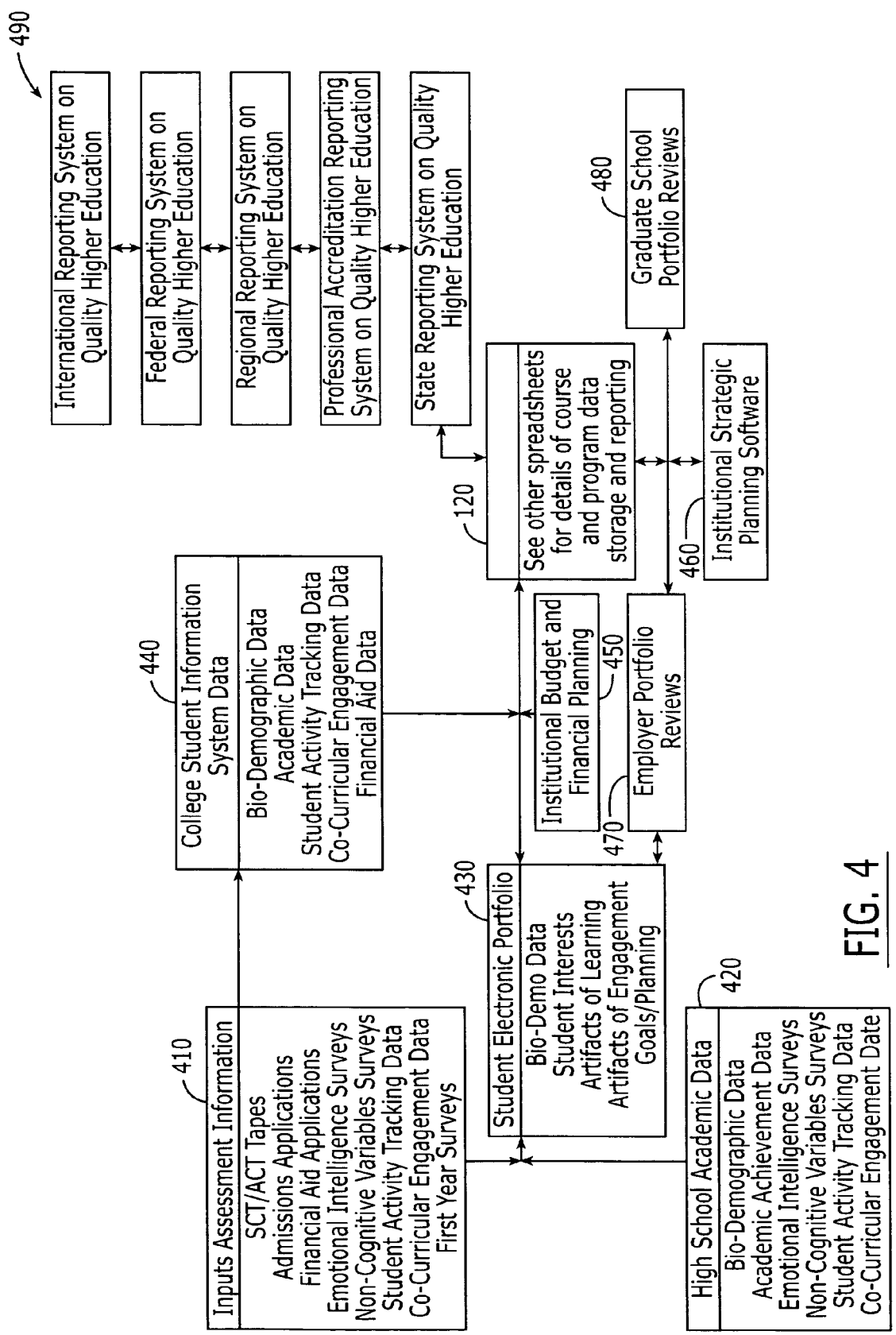
FIG. 4 is a block diagram illustrating other inputs and outputs that may be provided to standardize assessment according to other embodiments of the present invention.

FIG. 4 is a block diagram illustrating other inputs and outputs to a server such as the assess server 120 according to other embodiments of the present invention. As shown in FIG. 4, inputs of assessment information 410 and high school academic data 420 may be used to create a student electronic portfolio 430 that may be provided to the assess server 120, for example from student terminals 110d, college terminals 110f, accrediting agency 110g and/or other user terminals shown in FIG. 1. College student information system data 440 also may be provided based on actual information that is provided by other institutions to the student's college for the student. Institutional budget and financial planning information 450 also may be provided, as well as inputs from institutional strategic planning software 460. Employer portfolio reviews 470 and/or graduate school portfolio reviews 480 also may be generated from and placed in the student electronic portfolio 440 and/or the assess server 120. Finally, reports 490 may be generated, for example for international reporting, federal reporting, regional reporting, professional accreditation reporting and/or state reporting. Many additional examples of reports will be provided.

Table 1 provides an example of data entry screens that may be used for the various user terminals 110 of FIG. 1. These examples are merely illustrative and shall not be construed as limiting the present invention. As shown in Table 1, "Federal Government Basics" may be entered, including text for detailed program objectives and program objective code words that become a drop down list, to provide a standard list of key words. Table 1 also illustrates "Regional Accreditation System Basics" and "Regional Accreditation Standards", including free text standards and code words. Table 1 also illustrates other data entry screen designs for the "State System Basics", "Institution Objectives" and "Professional Accreditor Objectives". Table 1 also illustrates data entry screens for the "College/Division Basics", including free-form text entry of objectives and code words which may be used to form a standardized set of keywords for the objectives. Table 1 also illustrates similar data entry screens for "College/Division Objectives" and "Department Basics".

Still referring to Table 1, at the program level, in addition to keywords and free-form text related to "Program Basics" and "Program Objectives", additional information is sought as to program outcomes, including code words for the outcomes. This can provide a mechanism for capturing assessment methodology as text and codes (for example Block 310 of FIG. 3) and capturing observations as text and rankings (for example Block 320 of FIG. 3). Table 1 also illustrates similar data entry for courses and activities.

Table 1 also illustrates capturing educational assessment observations as text and rankings in terms of "Course/ Activity Outcomes And Objectives". A detailed program outcome may be entered, which then become a drop-down list. Program outcome code words also may be entered, which becomes a drop-down list. Program outcomes can use the same set of code words. Criteria ranking systems also may be selected, as will be described below in Table 2.

TABLE 1

Federal Government Basics

| | | |
|---|---|---|
| Name of the Federal Government Department | Drop Down Box | |
| Federal Government Code | Automatic Fill from Format | |
| Federal Government URL | Insert link | |
| What is your mission? | Type in | |
| What is your vision? | Type in | |
| Related Links for Support Documentation | Insert link or pull in document | |
| Institution Contact Last Name (many to one) | Drop Down Box | Repeat as often as necessary |
| Institution Contact First Name | Drop Down Box | |
| Title | Automatic Fill | |
| Assessment Role | Drop Down Box | |
| Address 1 | Automatic Fill | |
| Address 2 | Automatic Fill | |
| City | Automatic Fill | |
| State | Automatic Fill | |
| Zip | Automatic Fill | |
| Phone | Automatic Fill | |
| Fax | Automatic Fill | |
| Email | Automatic Fill | |
| What are your standards? | Type in Detailed Program Objective | Repeat as often as necessary |
| Type in some code words to help you remember this standard. | Type in Program Objective Code Words - this becomes a drop down list | Repeat as often as necessary |
| What type of standard is this (long -term or short term)? | Drop Down Box | Repeat as often as necessary |

Regional Accreditation System Basics

| | | |
|---|---|---|
| Name of your Regional Accreditation System | Drop Down Box | |
| Regional Accreditation Code | Automatic Fill | |
| Regional Accreditation System URL | Insert link | |
| What is your mission? | Type in | |
| What is your vision? | Type in | |
| Related Links for Support Documentation | Insert link or pull in document | |
| Institution Contact Last Name (many to one) | Drop Down Box | Repeat as often as necessary |
| Institution Contact First Name | Drop Down Box | |
| Title | Automatic Fill | |
| Assessment Role | Drop Down Box | |
| Address 1 | Automatic Fill | |
| Address 2 | Automatic Fill | |
| City | Automatic Fill | |
| State | Automatic Fill | |
| Zip | Automatic Fill | |
| Phone | Automatic Fill | |
| Fax | Automatic Fill | |
| Email | Automatic Fill | |

Regional Accreditation Standards

| | | |
|---|---|---|
| What are your standards? | Type in Detailed Program Objective | Repeat as often as necessary |
| Type in some code words to help you remember this standards. | Type in Program Objective Code Words - this becomes a drop down list | Repeat as often as necessary |
| What type of standard is this (long -term or short term)? | Drop Down Box | Repeat as often as necessary |
| Which federal objectives is this regional accreditor objective related to? | Drop Down Box with check boxes | Repeat for each objective |

State System Basics

| | |
|---|---|
| Name of your State System | Drop Down Box |
| State Code | Automatic Fill |
| State System URL | Insert link |
| What is your state mission? | Type in |

TABLE 1-continued

| | | |
|---|---|---|
| What is your state vision? | Type in | |
| Related Links for Support Documentation | Insert link or pull in document | |
| Institution Contact Last Name (many to one) | Drop Down Box | Repeat as often as necessary |
| Institution Contact First Name | Drop Down Box | |
| Title | Automatic Fill | |
| Assessment Role | Drop Down Box | |
| Address 1 | Automatic Fill | |
| Address 2 | Automatic Fill | |
| City | Automatic Fill | |
| State | Automatic Fill | |
| Zip | Automatic Fill | |
| Phone | Automatic Fill | |
| Fax | Automatic Fill | |
| Email | Automatic Fill | |
| State System Objectives | | |
| What are your state objectives? | Type in Detailed Program Objective | Repeat as often as necessary |
| Type in some code words to help you remember this objective. | Type in Program Objective Code Words - this becomes a drop down list | Repeat as often as necessary |
| What type of objective is this (long -term or short term)? | Drop Down Box | Repeat as often as necessary |
| Which federal objectives is this state objective related to? | Drop Down Box with check boxes | Repeat for each objective |
| Which regional accreditor objectives is this state objective related to? | Drop Down Box with check boxes | Repeat for each objective |
| Institution Basics | | |
| Name of your institution | Drop Down Box | |
| Institution Code | Automatic Fill | |
| Institution URL | Insert link | |
| What is your institution mission? | Type in | |
| What is your institution vision? | Type in | |
| Related Links for Support Documentation | Insert link or pull in document | |
| Institution Contact Last Name (many to one) | Drop Down Box | Repeat as often as necessary |
| Institution Contact First Name | Drop Down Box | |
| Title | Automatic Fill | |
| Assessment Role | Drop Down Box | |
| Address 1 | Automatic Fill | |
| Address 2 | Automatic Fill | |
| City | Automatic Fill | |
| State | Automatic Fill | |
| Zip | Automatic Fill | |
| Phone | Automatic Fill | |
| Fax | Automatic Fill | |
| Email | Automatic Fill | |
| Institution Objectives | | |
| What are your institution objectives? | Type in Detailed Program Objective | Repeat as often as necessary |
| Type in some code words to help you remember this objective. | Type in Program Objective Code Words - this becomes a drop down list | Repeat as often as necessary |
| What type of objective is this (long -term or short term)? | Drop Down Box | Repeat as often as necessary |
| Which state objectives is this institution objective related to? | Drop Down Box with check boxes | Repeat for each objective |
| Which regional accreditation standards is this institution objective related to? | Drop Down Box with check boxes | Repeat for each objective |
| Which federal government standards is this institution objective related to? | Drop Down Box with check boxes | Repeat for each objective |
| Professional Accreditation Basics | | |
| Name of Accreditor | Drop Down Box | |
| Accreditor Code | Automatic Fill | |
| Accreditor URL | Insert link | |
| What is the accreditor's mission? | Type in | |
| What is the accreditor's vision? | Type in | |
| Related Links for Support Documentation | Insert link or pull in document | |
| Accreditor Contact Last Name (many to one) | Drop Down Box | Repeat as often as necessary |
| Accreditor Contact First Name | Drop Down Box | |
| Title | Automatic Fill | |

TABLE 1-continued

| | | |
|---|---|---|
| Assessment Role | Drop Down Box | |
| Address 1 | Automatic Fill | |
| Address 2 | Automatic Fill | |
| City | Automatic Fill | |
| State | Automatic Fill | |
| Zip | Automatic Fill | |
| Phone | Automatic Fill | |
| Fax | Automatic Fill | |
| Email | Automatic Fill | |
| Professional Accreditor Objectives | | |
| Accreditor Name | Drop Down Code | |
| What are the accreditor's objectives? | Drop Down Code | Repeat as often as necessary |
| Type in some code words to help you remember this objective. | Type in Program Objective Code Words - this becomes a drop down list | Repeat as often as necessary |
| What type of objective is this (long-term or short term)? | Drop Down Box | Repeat as often as necessary |
| Which institutional objectives is this accreditor objective related to? | Drop Down Box with check boxes | Repeat for each objective |
| College/Division Basics | | |
| Name of your college/division | Drop Down Box | |
| College/Division Code | Automatic Fill | |
| College/Division URL | Insert link | |
| What is your college/division mission? | Type in | |
| What is your college/division vision? | Type in | |
| Related Links for Support Documentation | Insert link or pull in document | |
| College/Division Contact Last Name (many to one) | Drop Down Box | Repeat as often as necessary |
| College/Division Contact First Name | Drop Down Box | |
| Title | Automatic Fill | |
| Assessment Role | Drop Down Box | |
| Address 1 | Automatic Fill | |
| Address 2 | Automatic Fill | |
| City | Automatic Fill | |
| State | Automatic Fill | |
| Zip | Automatic Fill | |
| Phone | Automatic Fill | |
| Fax | Automatic Fill | |
| Email | Automatic Fill | |
| College/Division Objectives | | |
| What are your college/division objectives? | Type in Detailed Program Objective | Repeat as often as necessary |
| Type in some code words to help you remember this objective. | Type in Program Objective Code Words - this becomes a drop down list | Repeat as often as necessary |
| What type of objective is this (long-term or short term)? | Drop Down Box | Repeat as often as necessary |
| Which institutional objectives does this college/division objective related to? | Drop Down Box with check boxes | Repeat for each objective |
| Which professional accreditor objectives does this college/division objective related to? | Drop Down Box with check boxes | Repeat for each objective |
| Department Basics | | |
| Name of your department | Drop Down Box | |
| Department Code | Automatic Fill | |
| Department URL | Insert link | |
| What is your department mission? | Type in | |
| What is your department vision? | Type in | |
| Related Links for Support Documentation | Insert link or pull in document | |
| Department Contact Last Name (many to one) | Drop Down Box | Repeat as often as necessary |
| Department Contact First Name | Drop Down Box | |
| Title | Automatic Fill | |
| Assessment Role | Drop Down Box | |
| Address 1 | Automatic Fill | |
| Address 2 | Automatic Fill | |
| City | Automatic Fill | |
| State | Automatic Fill | |
| Zip | Automatic Fill | |
| Phone | Automatic Fill | |
| Fax | Automatic Fill | |
| Email | Automatic Fill | |

TABLE 1-continued

Department Objectives

| | | |
|---|---|---|
| What are your department objectives? | Type in Detailed Program Objective | Repeat as often as necessary |
| Type in some code words to help you remember this objective. | Type in Program Objective Code Words - this becomes a drop down list | Repeat as often as necessary |
| What type of objective is this (long -term or short term)? | Drop Down Box | Repeat as often as necessary |
| Which institutional objectives does this department objective related to? | Drop Down Box with check boxes | Repeat for each objective |
| Which accreditor objectives does this department objective related to? | Drop Down Box with check boxes | Repeat for each objective |
| Which college/division objectives does this department objective related to? | Drop Down Box with check boxes | Repeat for each objective |

Program Basics

| | |
|---|---|
| Name of your program | Drop Down Box |
| Program Code | Automatic Fill |
| Program URL | Insert link |
| What is your program mission? | Type in |
| What is your program vision? | Type in |
| Related Links for Support Documentation | Insert link or pull in document |
| Program Contact Last Name (many to one) | Drop Down Box | Repeat as often as necessary |
| Program Contact First Name | Drop Down Box |
| Title | Automatic Fill |
| Assessment Role | Drop Down Box |
| Address 1 | Automatic Fill |
| Address 2 | Automatic Fill |
| City | Automatic Fill |
| State | Automatic Fill |
| Zip | Automatic Fill |
| Phone | Automatic Fill |
| Fax | Automatic Fill |
| Email | Automatic Fill |

Program Objectives

| | | |
|---|---|---|
| What are your program objectives? | Type in Detailed Program Objective | Repeat as often as necessary |
| Type in some code words to help you remember this objective. | Type in Program Objective Code Words - this becomes a drop down list | Repeat as often as necessary |
| What type of objective is this (long -term or short term)? | Drop Down Box | Repeat as often as necessary |
| Which institutional objectives does this program objective relate to? | Drop Down Box with check boxes | Repeat for each objective |
| Which accreditor objectives does this program objective relate to? | Drop Down Box with check boxes | Repeat for each objective |
| Which college/division objectives does this program objective relate to? | Drop Down Box with check boxes | Repeat for each objective |
| Which departmental objectives does this program objective relate to? | Drop Down Box with check boxes | Repeat for each objective |

Program Outcomes and Objectives

| | | |
|---|---|---|
| What are your program outcomes? | Type in Detailed Program Outcome - this becomes a drop down list | Repeat as often as necessary |
| Type in some code words to help you remember this outcome. | Type in Program Outcome Code Words - this becomes a drop down list | Repeat as often as necessary |

As you type in each outcome;

| | |
|---|---|
| Check the program objectives to which each outcome relates | Drop Down Box with check boxes |
| Check the department objectives to which each outcome relates | The rest of these links are automatically made based are earlier pre-defined relationships, however, the user can choose to un-link a relationship by outcome. |
| Check the college objectives to which each outcome relates | |
| Check the university objectives to which each outcome relates | |
| Check the regional accreditor objectives to which each outcome relates | |
| Check the state objectives to which each outcome relates | |
| Check the federal objectives to which each outcome relates | |

TABLE 1-continued

Program Outcomes Assessment Plan

| | | |
|---|---|---|
| Choose a Program Outcome | Drop Down Box | |
| Choose a Program Assessment Method | Drop Down Box | Repeat as often as necessary |
| Type in Detailed Assessment Method Description | Type in | |
| In which academic year are you assessing this outcome? | Drop Down Box (select one or more than one) | |
| Choose an Assessment Tool | Drop Down Box | Repeat as often as necessary |
| Type in Detailed Assessment Tool Description | Type in | |
| Link to Assessment Tool | Link Option | |
| Choose a Criteria Ranking System | Drop Down Box | |
| Link to Assessment Tool Criteria | Link Option | |
| Who is the audience being assessed? | Drop Down Box | |
| When will the tool be administered? | Drop Down Box | |
| Who will administer it? | Drop Down Box | |
| Send email reminder to person administering tool two weeks prior to tool administration date? | Yes/No | |

Course/Activity Outcomes and Objectives

| | | |
|---|---|---|
| What are your course outcomes? | Type in Detailed Program Outcome - this becomes a drop down list | Repeat as often as necessary |
| Type in some code words to help you remember this outcome. | Type in Program Outcome Code Words - this becomes a drop down list | Repeat as often as necessary |

As you type in each outcome;

| | |
|---|---|
| Check the program outcomes to which each outcome relates | Drop Down Box with check boxes |

Course/Activity Outcomes Assessment Plan

| | | |
|---|---|---|
| Choose a Program Outcome | Drop Down Box | |
| Which courses are helping you meet this outcome? | Drop Down Box with check boxes | |
| Course Description | Type in | Repeat as often as necessary |
| Link to course syllabus | Type in | |

Course/Activity Outcomes Assessment Plan, II

| | | |
|---|---|---|
| Choose a Course Outcome | Drop Down Box | |
| Choose a Course Assessment Method | Drop Down Box | Repeat as often as necessary |
| Type in Detailed Assessment Method Description | Type in | |
| In which academic year are you assessing this outcome? | Drop Down Box (select one or more than one) | |
| Choose an Assessment Tool | Drop Down Box | Repeat as often as necessary |
| Type in Detailed Assessment Tool Description | Type in | |
| Link to Assessment Tool | Link Option | |
| Choose a Criteria Ranking System | Drop Down Box | |
| Link to Assessment Tool Criteria | Link Option | |
| Who is the audience being assessed? | Drop Down Box | |
| When will the tool be administered? | Drop Down Box | |
| Send email reminder two weeks prior to tool administration date? | Yes/No | |

Program Outcomes Observations and Decisions

| | | |
|---|---|---|
| Choose a Program Outcome | Drop Down Box with check list | |
| Type in Observation you made about this outcome | Type in | Repeat as often as necessary |
| Type in some code words to help you remember this observation | Type in and later become drop down lists | |
| Which tool did you use to gather the evidence for this observation | Drop Down Box | May select more than one tool |
| Which method did you use to gather the evidence for this observation | Drop Down Box | |
| Choose a Criteria Rank | Drop Down Box | |
| Who Made Observation | Drop Down Box | |
| Could this finding be considered a strength, weakness, or neutral? | Drop Down Box | |
| Date of Observation | Drop Down Box | |
| What was the decision made for this observation? | Type in | |
| Type in some code words to help you remember this decision | Type in and later become drop down lists | |
| Date of Decision Made | Drop Down Box | |
| Misc. Notes about findings and decision made | Type in | |

TABLE 1-continued

| | |
|---|---|
| Date of Notes | Drop Down Box |
| Reminder for next time you assess this outcome | Type in |
| Send email to remind you of this assessment reminder note on which date | Drop Down Box |
| Link to related data | |
| Link to related criteria | |
| Link to related reports | |

Course/Activity Outcomes Observations and Decisions

| | | |
|---|---|---|
| Choose a Course Outcome | Drop Down Box with check list | |
| Type in Observation you made about this outcome | Type in | Repeat as often as necessary |
| Type in some code words to help you remember this observation | Type in; this later becomes a drop down box | |
| Which tool did you use to gather the evidence for this observation | Drop Down Box | |
| Which method did you use to gather the evidence for this observation | Drop Down Box | |
| Choose a Criteria Rank | Drop Down Box | |
| Who Made Observation | Drop Down Box | |
| Could this finding be considered a strength, weakness, or neutral? | Drop Down Box | |
| Date of Observation | Drop Down Box | |
| What was the decision made for this observation? | Type in | |
| Type in some code words to help you remember this decision | Type in; this later becomes a drop down box | |
| Date of Decision Made | Drop Down Box | |
| Misc. Notes about finding | Type in | |
| Date of Notes | Drop Down Box | |
| Reminder for next time you assess this outcome | Type in | |
| Send email to remind you of this assessment reminder note on which date | Drop Down Box | |
| Link to related data | | |
| Link to related criteria | | |
| Link to related reports | | |

Table 2 provides three examples of rubrics that may be generated according to various embodiments of the present invention. As was described above, rubrics refer to observations that are captured as text and rankings.

More specifically, Table 2 illustrates three examples of various expert generated categories for particular educational activities: journal assignments, research papers and oral presentations. For each category, text is provided that describes the objectives for this category, and a numeric ranking is provided by the expert based on the expert's assessment of the relative weights of achieving, for example, exemplary, developing or beginning skills in the various categories. These rankings may not all add up to the same number. Accordingly, embodiments of the present invention allow the rankings to be normalized, so that they all can be based on a common scale.

Thus, as shown in Table 2, the maximum rankings for journal assignments, for research paper evaluation and for oral presentations, all add up to 100. The expert may also be allowed to indicate a score for various levels of performance. Thus, regardless of the scale in which the educational assessment observations are captured as rankings, these rankings may be normalized to provide standardized rankings across various observations.

In some embodiments, normalizing may be performed by the system, method and/or computer program product. In other embodiments, the normalizing may be performed by the expert manually and provided to the system, method and/or computer program product. Assessment observations thereby may be characterized by normalized rankings, for example, 1, 2, 3, 4, 5; a, b, c, d, f; or other normalized rankings. It will be understood by those having skill in the art that many different alphabetical, numeric and/or alphanumeric schemes may be used to normalize the rankings, and the number of rankings in the normalized set may vary in various embodiments of the present invention.

TABLE 2

EAC 779 Reflection Rubric for Journal Assignments

| Category | Exemplary | Developing | Beginning | Level |
|---|---|---|---|---|
| Knowledge | Demonstrates a clear recognition of the vocabulary, concepts, and themes presented in the readings and class discussion by utilizing each throughout the journal | Demonstrates recognition of some of the vocabulary, concepts, and themes presented in the readings and class discussion through incorporating certain of | Demonstrates inadequate recognition of the vocabulary, concepts, and themes presented in the readings and class discussion by incorrectly using or omitting the | |

TABLE 2-continued

EAC 779 Reflection Rubric for Journal Assignments

| | | | |
|---|---|---|---|
| | entry. | these in the journal entry. | previously mentioned aspects. |
| Student could improve by: | 17 | 9 | 0 |
| Comprehension | Journal entry illustrates a thorough description of material presented in the reflection question, the readings, and the class discussion by providing appropriate explanations of material and descriptions or examples from past experiences. | Journal entry illustrates an understanding of material presented in the reflection question, the readings, and the class discussion by providing one of the following: explanations of material, descriptions of material, or examples from past experiences. | Journal entry illustrates a clear misunderstanding of material presented in the reading, class discussion, and/or reflection question by including incorrect explanations or examples. |
| Student could improve by: | 16 | 8 | 0 |
| Application | Journal entry displays student's proficiency in articulating the use of the material included in both the reading and class discussion through incorporation of practical evaluation and programming ideas. | Journal entry displays student's ability to articulate the use of the material included in either the reading or class discussion through incorporation of practical evaluation and programming ideas. | Journal entry does not indicate student's ability to adequately apply material provided in readings and class discussion to practical or functional evaluation and programming ideas. |
| Student could improve by: | 17 | 9 | 0 |
| Analysis | Journal entry exemplifies the student's mastery of material through clearly articulated evidence of comparison and differentiation of similar and dissimilar situations applicable to information provided in the reading and class discussions. | Journal entry exhibits the student's ability to differentiate between material equivalent to information provided in the reading and class discussions and material which displays minimal connection to the readings and discussion. | Journal entry does not adequately illustrate the student's ability to make a distinction between key concepts expressed in the readings and class discussions. |
| Student could improve by: | 16 | 8 | 0 |
| Synthesis | Journal entry illustrates student's proficiency to modify and translate the concepts presented in class discussion and readings into practical, functional alternatives and situations by integrating hypothetical ideas, past experiences, and course-presented information. | Journal entry illustrates student's ability to modify or translate the concepts presented in class discussion and readings into possible situations by integrating hypothetical ideas or past experiences with course-presented information. | Journal entry does not illustrate the student's ability to modify or translate the concepts presented in class discussion and readings into possible situations by integrating hypothetical ideas or past experiences with course-presented information. |
| Student could improve by: | 17 | 9 | 0 |
| Evaluation | Journal entry shows evidence of well thought out appraisal of information presented in course readings and class discussion. Student's ability to contrast the material with real life situations is exhibited. Well researched and supported critiques are present. | Journal entry shows evidence of appraisal of information presented in course readings and class discussion. Student's ability to contrast the material with real life situations is exhibited. Critiques are present but evidence of outside supportive documentation is less evident than in exemplary category. | Journal entry contains unsupported or inadequately supported arguments and critiques of material presented in readings and class discussion. Student's issues are based on opinion more than on substantiated conclusions. |
| Student could improve by: | 17 | 9 | 0 |

Research Paper Evaluation

Name of Presenter:_____
Date:_____
Category Selected:_____

| | Novice | Intermediate | Distinguished |
|---|---|---|---|
| Audience Awareness | Limited awareness of | An attempt to establish and | Establishes and maintains |

TABLE 2-continued

EAC 779 Reflection Rubric for Journal Assignments

| | | | |
|---|---|---|---|
| | audience and/or purpose | maintain purpose and communicate with the audience | clear focus; evidence of distinctive voice and/or appropriate tone |
| 10 | 0 | 5 | 10 |
| Idea Development | Minimal idea development, limited and/or unrelated details | Unelaborated idea development; unelaborated and/or repetitious details | Depth and complexity of ideas supported by rich, engaging, and or pertinent details; evidence of analysis, reflection and insight |
| 20 | 0 | 10 | 20 |
| Appropriate References | Few appropriate references | Some appropriate references | Use of references indicate substantial research |
| 10 | 0 | 5 | 10 |
| Organization | Random or weak organization | Organization is present in some places but not in others | Careful and/or suitable organization |
| 20 | 0 | 10 | 20 |
| Transitions | Incorrect or lack of topic and/or transition sentences | Lapses in focus and/or coherence | Transitions are smooth and logical |
| 10 | 0 | 5 | 10 |
| Sentence Structure | Incorrect and/or ineffective wording and/or sentence structure | Simplistic and/or awkward sentence structure | Variety of sentence structure and length |
| 10 | 0 | 5 | 10 |
| Language | Simplistic and imprecise language | Simplistic yet imprecise language | Precise, rich language |
| 10 | 0 | 5 | 10 |
| Grammar | Many errors in grammar and format (e.g., spelling, punctuation, capitalization, headings) | Some errors in grammar and/or format that do not interfere with communication | No errors in grammar and/or format |
| 10 | 0 | 5 | 10 |
| Comments: | | | |

Oral Presentation Rubric

Presenter's Name:_____

| | Distinguished | Intermediate | Novice |
|---|---|---|---|
| Volume | Presenter is easy to hear. | Audience is able to hear as a whole, but there are times when volume is not quite adequate. | Presenter is difficult to hear. |
| 10 | 10 | 5 | 0 |
| Rates | Rates of speech are appropriate. | Speaker may at times seem like s/he is rushing or exaggerating pauses. | The rates of speaking are too slow or too fast. |
| 10 | 10 | 5 | 0 |
| Mannerisms | Speaker makes eye contact with everyone and has no nervous habits. Speaker has excellent posture. | Eye contact may focus on only one member of the audience or a select few members. Mildly distracting nervous habits are present but do not override the content. | Very little eye contact is made with the audience. It may sound like the speaker is reading the presentation. Nervous habits that distract the audience are present. |
| 10 | 10 | 5 | 0 |
| Engagement | Presentation involves audience, allowing time for audience to think and respond. | Audience is involved but inadequate processing or response time is provided. | Speaker does not involve audience. |
| 10 | 10 | 5 | 0 |
| Organization | Presentation is well organized with a beginning, middle, and end. There is a strong organizing theme, with clear main ideas and transitions. | Speaker loses train of thought, does not stay with the proposed outline, or connections are attempted but not made clear for the audience. | Presentation shows little organization, unclear purpose, and/or unclear relationships or transitions. |
| 20 | 20 | 10 | 0 |
| Content | Information is complete and accurate. Clear evidence of research. | Research component is less evident than in distinguished category or resources are present but less than adequate for assignment. | Details and examples are lacking or not well chosen for the topic or audience. Lacks evidence of research. |
| 20 | 20 | 10 | 0 |
| Visual Aids/Handouts | Visual aids are well done and are used to make | Visuals are adequate but do not inspire engagement with the | Very little or poor use of visual materials. No |

TABLE 2-continued

EAC 779 Reflection Rubric for Journal Assignments

| | presentation more interesting and meaningful. | material. | handouts provided. |
|---|---|---|---|
| 10 | 10 | 5 | 0 |
| Length | Appropriate length. Clear summary is provided. Audience is involved in synthesizing the information. | Time is appropriately used, but may run slightly over or under allotted time and/or information is not tied together or conclusion is inadequate. | Presentation lacks conclusion and/or time is not appropriately used. |
| 10 | 10 | 5 | 0 |
| Comments: | | | |

The information that is entered from the other terminals 110 of FIG. 1 may be stored in a relational database, such as the assess database 220 of FIG. 2. FIG. 5 illustrates a database schema for an example of an assess database according to some embodiments of the present invention. This example is provided for the sake of illustration, and shall not be viewed as limiting.

Figure 5A:
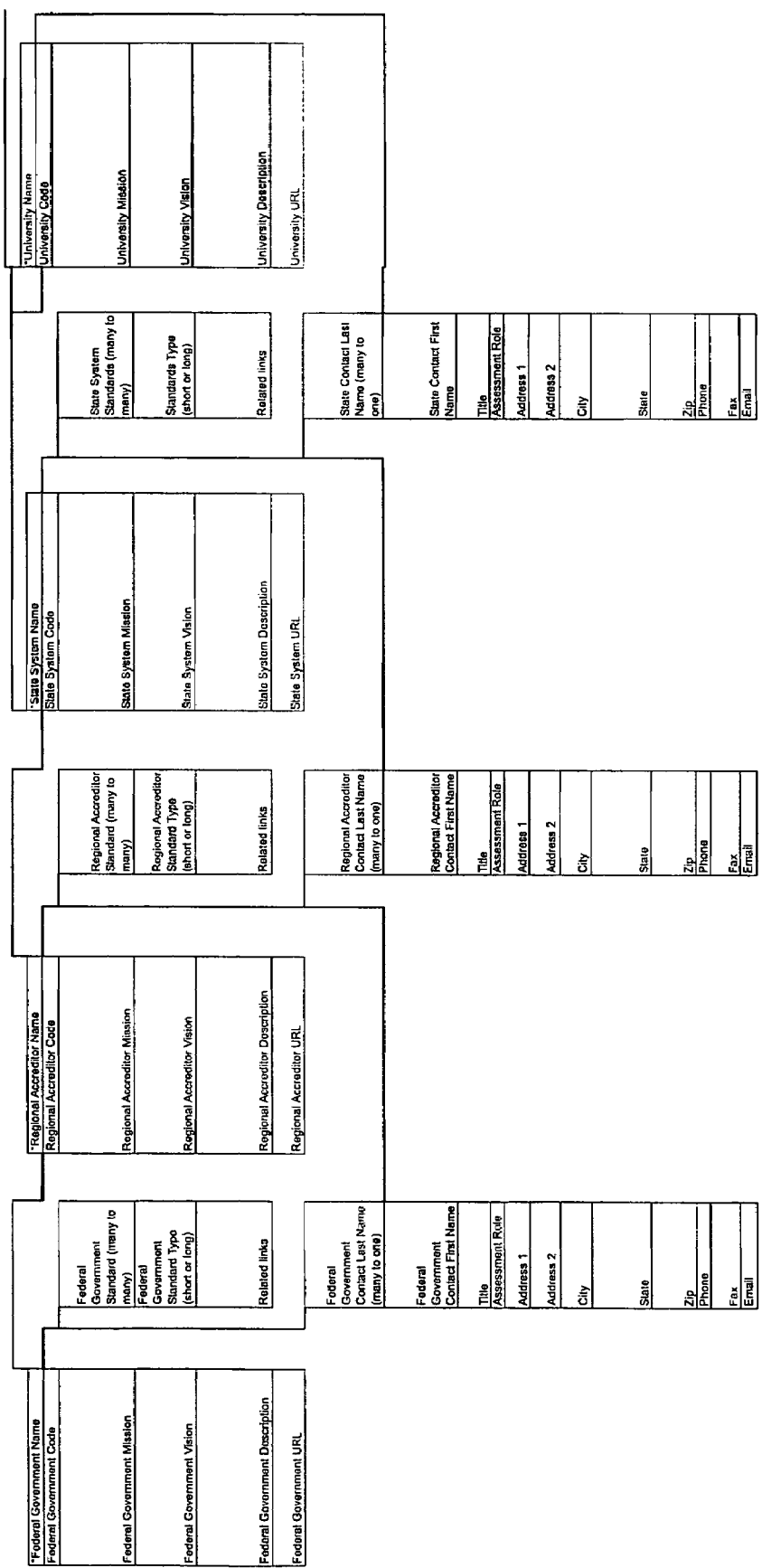
FIG. 5 illustrates a layout of FIGS. 5A-5K, which, when placed together as shown in FIG. 5, illustrates a layout of a database schema according to exemplary embodiments of the present invention.
Figure 5B:
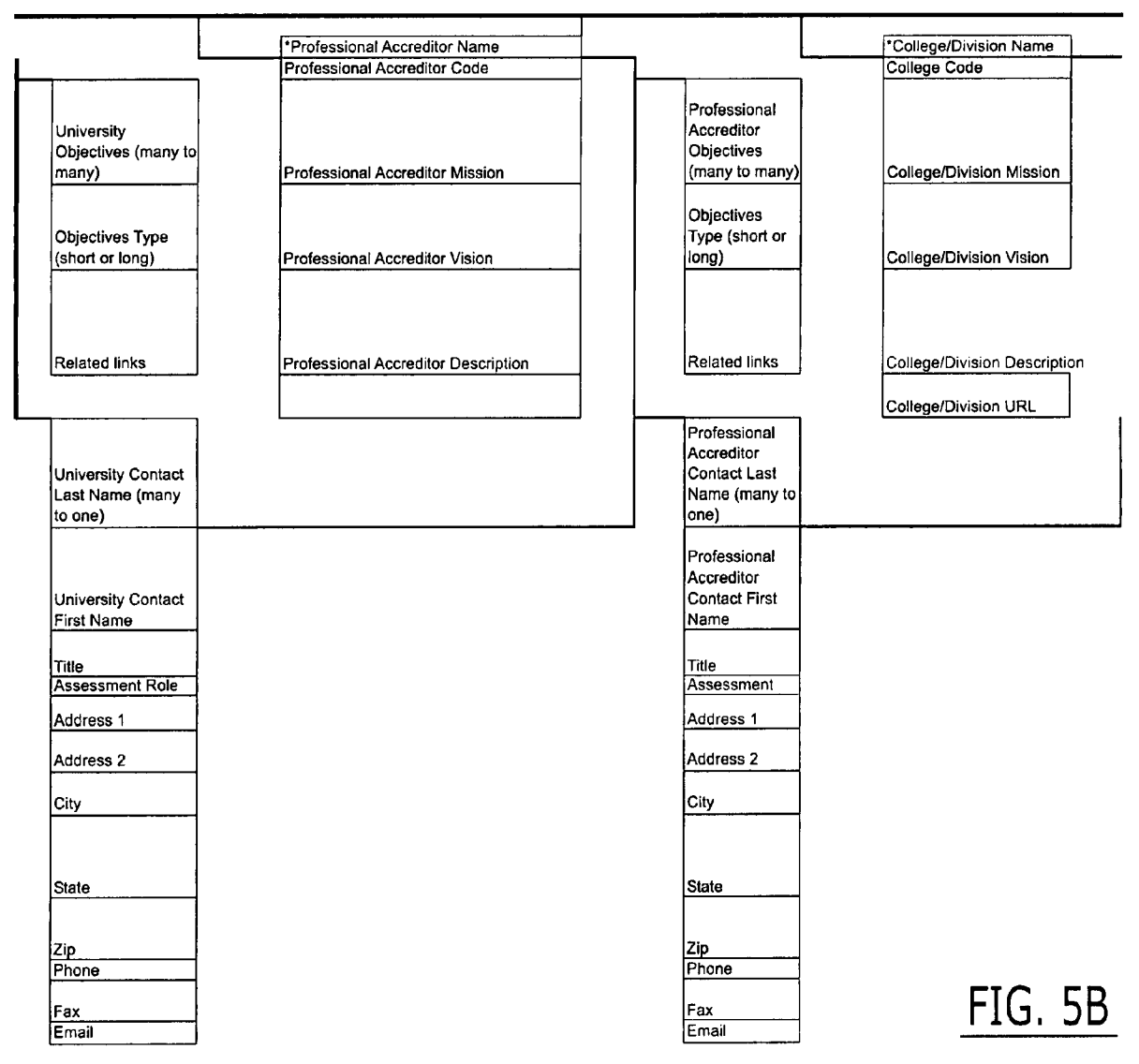
Figure 5C:
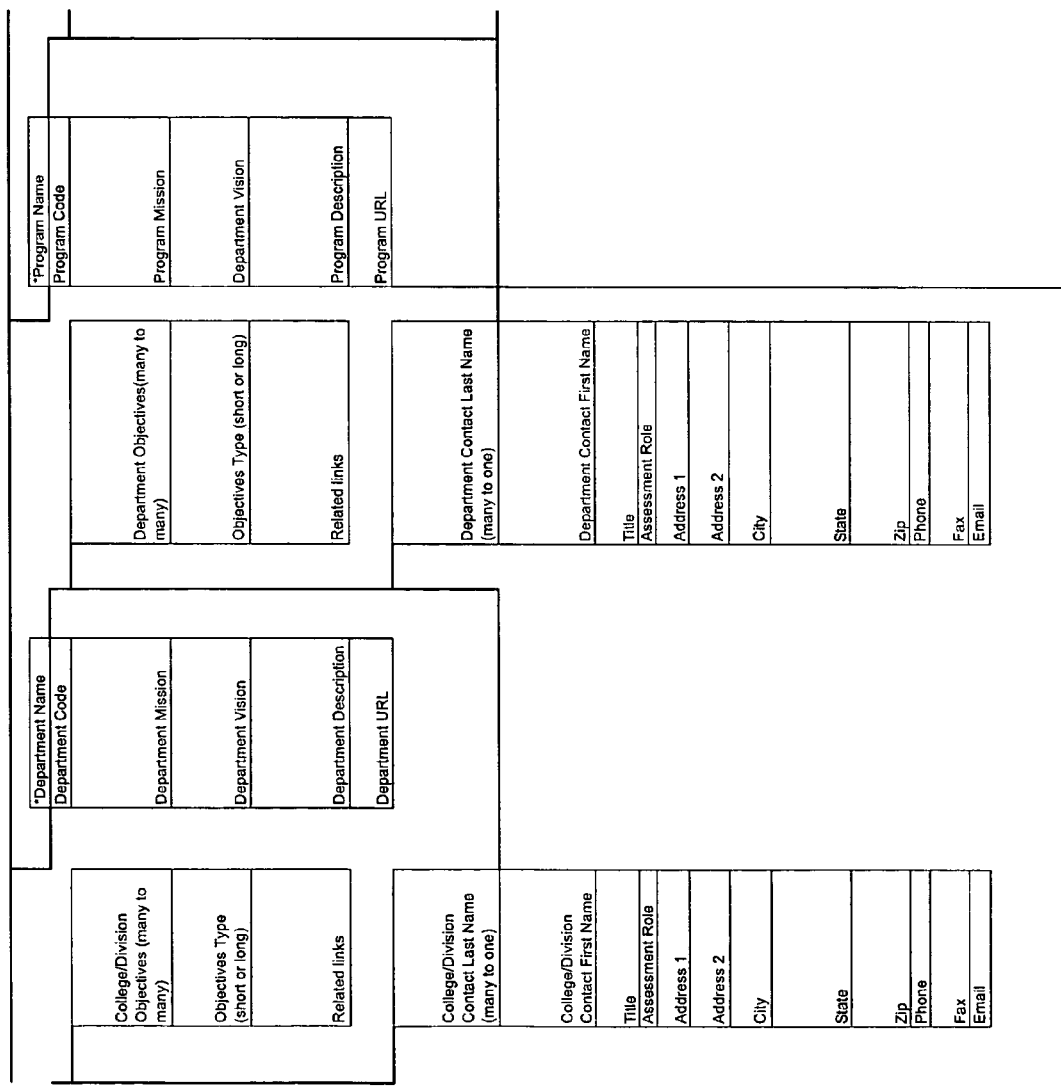
Figure 5F:
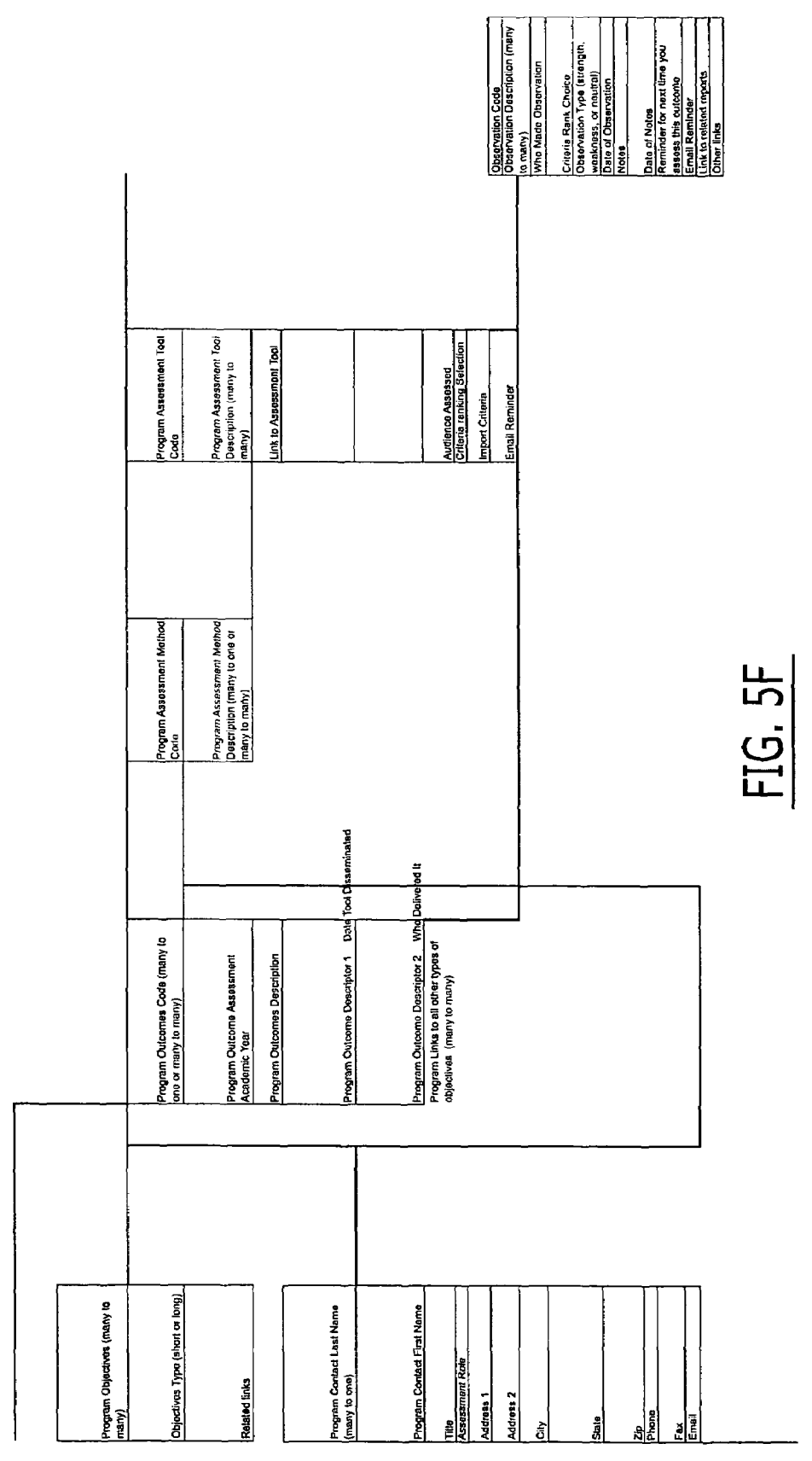
Figure 5G:
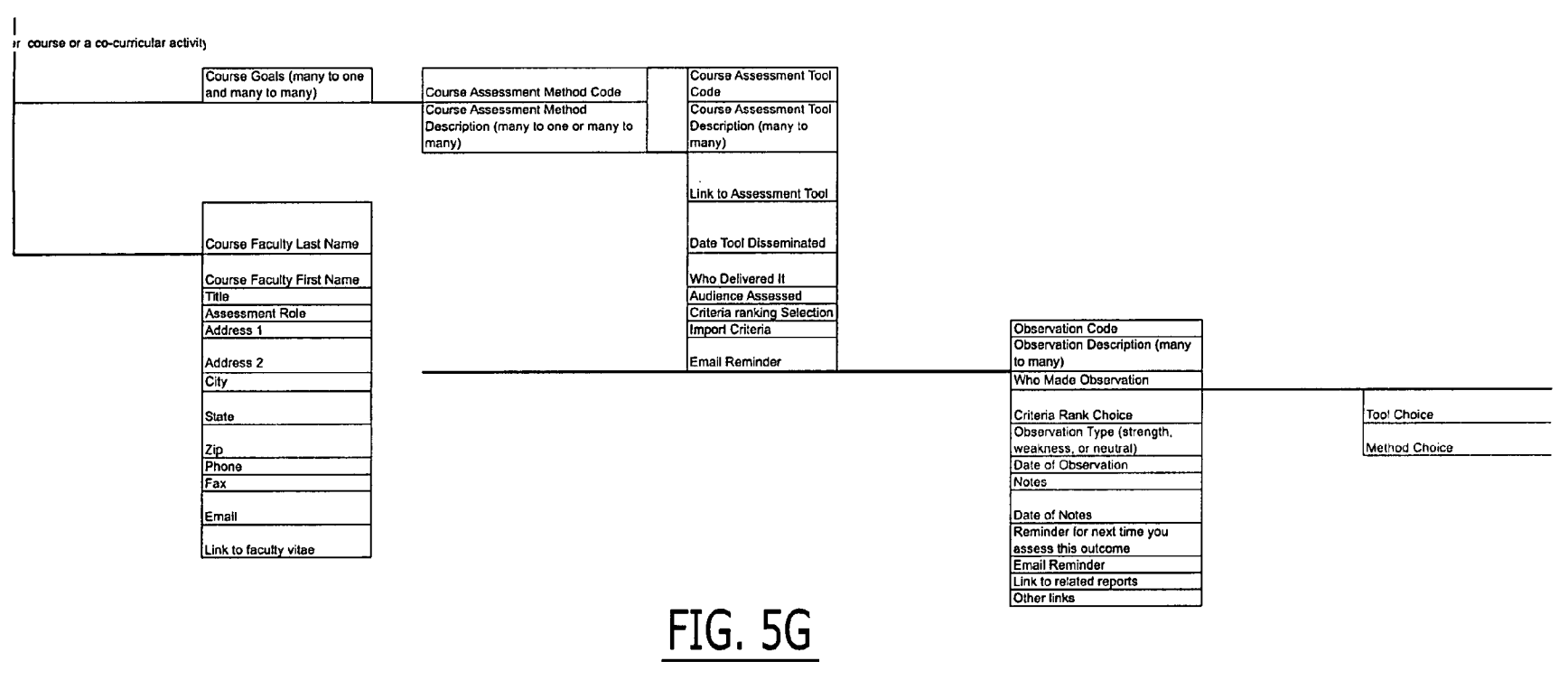
Figure 5H:
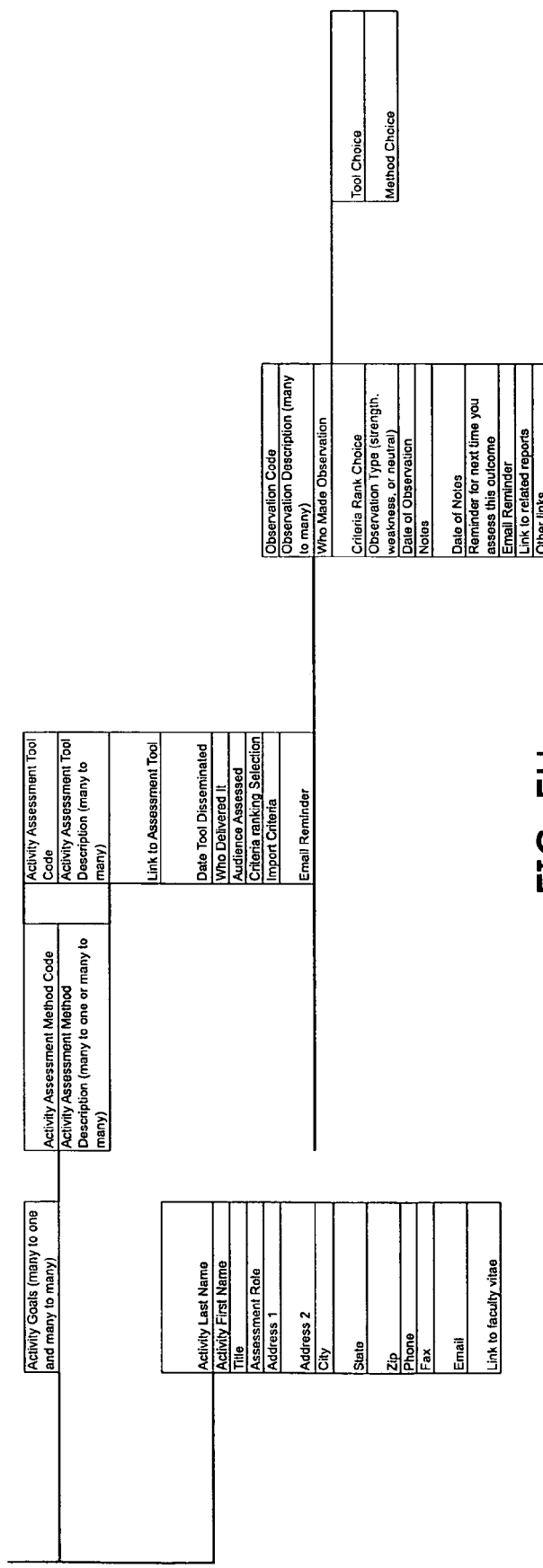

FIG. 5 is a layout of an overall database schema showing how FIGS. 5A-5K may be fit together to show the entire database schema. The database schema of FIGS. 5A-5K illustrates how common code words may be used to capture assessment methodologies, observations and outcomes across a plurality of institutions, according to some embodiments of the present invention.

FIG. 6 is a flowchart of operations that may be performed to use the normalized rankings and codes to generate assessment reports according to various embodiments of the invention, as was generally described at Block 340 of FIG. 3. As shown in FIG. 6 at Block 610, the dropdown box code words allow for the reports to be sorted and counted. Moreover, the detailed data link (text) to the code words can still be reported if desirable. However, the codes words may be reported and summarized more easily in some embodiments. At Block 620, summaries of types of outcomes, types of evaluation methods, types of assessment tools, types of observations and types of decisions can be mined, for example, using a text data miner and summarized in graphs. At Block 630, in a crosswalk table, each dropdown word may be assigned a numerical code. Through ordinal data analysis, the numbers are statistically manipulated to present descriptive summaries of findings across programs, departments, colleges, institutions, states, etc. At Block 640, through the faculty member assigning a criteria ranking number from a predefined ranking list to his or her observation, the group ranking of reports can also be compiled.

Figure 7:
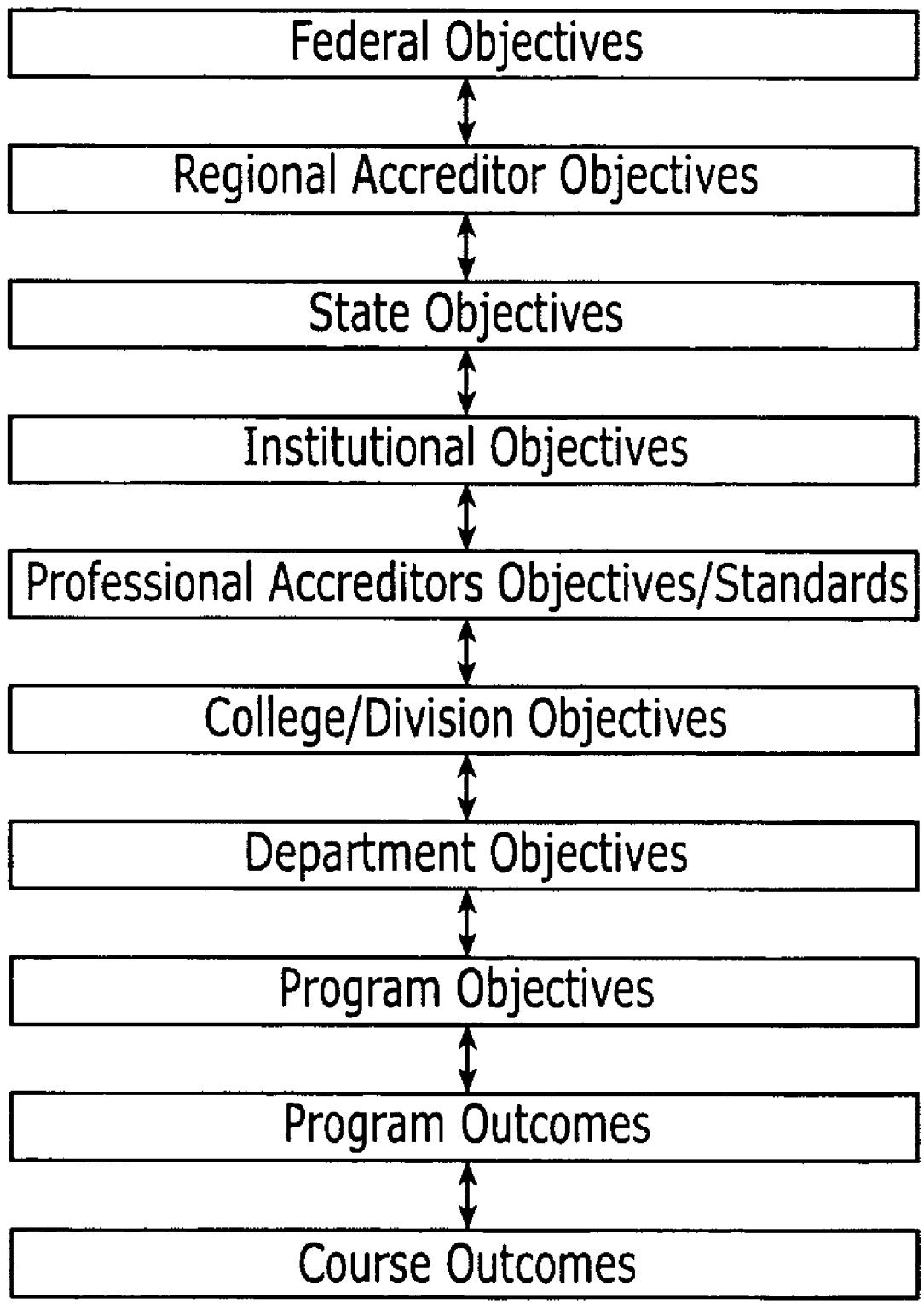
FIG. 7 is a flowchart of operations that may be performed to link objectives and normalized assessment outcomes to each other by a common set of codes according to various embodiments of the present invention.

FIG. 7 is a flowchart illustrating how objectives and normalized assessment outcomes may be linked to each other by a common set of code words that are entered into the previously designated dropdown list fields according to various embodiments of the present invention. Each data entry field can allow for objectives in the current field to be related to objectives from the previous field. These relationships may be stored in the assess database. Accordingly, these code words can allow reporting of all the data linked in these fields to be reported "by" other objectives to which they are linked. In other words, reports can be generated to illustrate that outcomes being assessed by programs actually "link" to goals and standards (e.g., objectives) at the department level and on up to the federal level. The arrows between the boxes of FIG. 7 indicate process flow in both directions.

Examples of the linking of objectives to normalized assessment outcomes according to various embodiments of the present invention will now be described. For example, a desired co-curricular outcome may be that students will be able to demonstrate problem solving skills as they plan student activity events posed from a student needs survey with a decreased budget. Evidence for the co-curricular outcome can include peer evaluations and paraprofessional evaluations of the planning meetings, as well as an overall evaluation of the student activity and its ability to meet student satisfaction while maintaining the state budget. This outcome and evidence may be linked to a desired program outcome that students will be able to demonstrate problem solving skills in a capstone essay as they examine the challenges and solutions to securing a management position in the technology industry of their choice. Evidence of the program outcome may include evaluation of the essay using a faculty-defined rubric, and review and summary of earlier problem solving artifacts. This may be linked to a university student learning principle having an outcome that students will be able to demonstrate problem solving skills based on evidence of evaluation of the essay using a faculty-defined rubric and review and summary of earlier problem solving artifacts.

Figure 8:
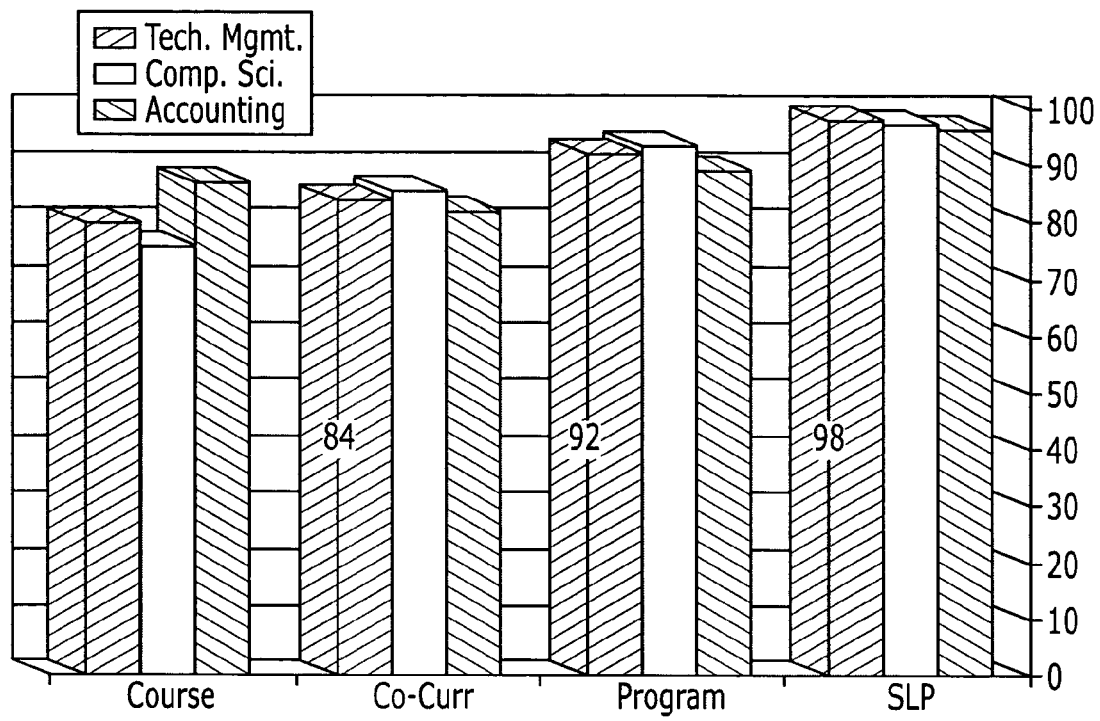
FIGS. 8 and 9 illustrate examples of reports that may be provided according to various embodiments of the present invention.
Figure 9:
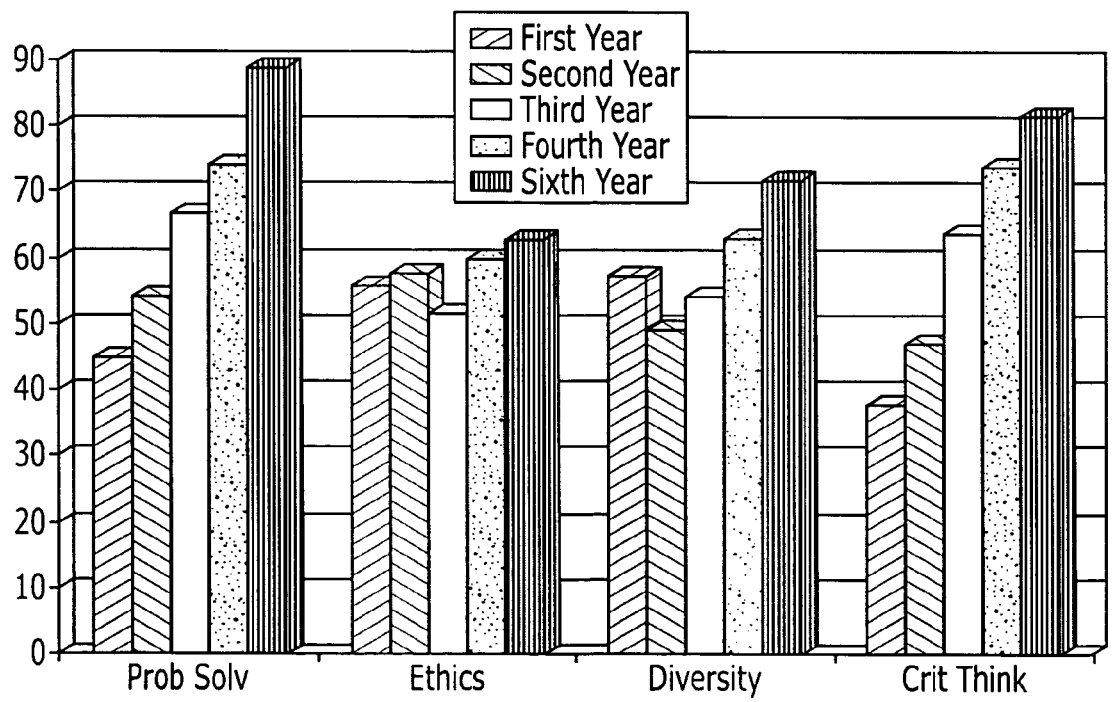

An example of a data rollup for reporting and planning purposes now will be provided. In particular, it may be found that courses which assessed problem solving skills found varied levels of problem solving early on in their course. Most faculty adjusted the courses to provide more opportunities to apply to theory to "real life" problems, and thus found a higher level of skills being demonstrated in the majority of students. This finding may roll up to the findings for problem solving for co-curriculars, that students involved in co-curricular opportunities had a variety to learn and apply problem solving skills. Some of the analysis was not completed, as the student withdrew from the project. Of that which was completed, 84% of the students were, for example, able to demonstrate a mastery of problem solving. FIG. 8 graphically illustrates a program comparison of problem solving outcomes based on the above. FIG. 9 graphically illustrates an example output for a university.

Table 3 is a listing of various dropdown selection of reports that may be available for an institution according to various embodiments of the present invention. Similar reports may be generated across multiple institutions. Table 3 is merely provided as an example, and shall not be construed as limiting embodiments of the present invention.

TABLE 3

Assessment Plan Reporting

Assessment Plan for Program or Course
Includes unit objectives, outcomes, evaluation methods, assessment tools, results, decisions
made, criteria ranking, dates of actions, etc.
Can sort report by these fields and they can all become by variables within by variables
Assessment Plan for Program or Course by Program Objectives
Assessment Plan for Program or Course by Department Objectives
Can nest sub-levels of objectives within department
Assessment Plan for Program or Course by College/Division Objectives
Can nest sub-levels of objectives within college/division
Assessment Plan for Program or Course by University Objectives
Can nest sub-levels of objectives within institution
Assessment Plan for Program or Course by Professional Accreditor Objectives
Can nest sub-levels of objectives within professional accreditor
Assessment Plan or Program or Course by Regional Accreditor Objectives
Can nest sub-levels of objectives within regional accreditor
Assessment Plan for Program or Course by State Objectives
Can nest sub-levels of objectives within state
Assessment Plan for Program or Course by Federal Objectives
Can nest sub-levels of objectives within federal Outcomes Reporting

| Listing of types of outcomes | Listing of types of outcomes by course and/or program | Listing of types of outcomes by course and/or program outcome |
|---|---|---|
| by course | by program objectives | by program objectives |
| by program | by department objectives | by department objectives |
| by department | by college objectives | by college objectives |
| by college/division | by professional accreditor objectives | by professional accreditor objectives |
| by professional accreditor | by college/division objectives | by college/division objectives |
| by college | by regional accreditor objectives | by regional accreditor objectives |
| by regional accreditor | by institution objectives | by institution objectives |
| by institution | by state objectives | by state objectives |
| by state | by federal objectives | by federal objectives |
| by federal | | |

Evaluation Methods Reporting

| Listing of types of evaluation methods | Listing of types of evaluation methods by course and/or program | Listing of types of evaluation methods by course and/or program outcome |
|---|---|---|
| by course | by program objectives | by program objectives |
| by program | by department objectives | by department objectives |
| by department | by college objectives | by college objectives |
| by college/division | by professional accreditor objectives | by professional accreditor objectives |
| by professional accreditor | by college/division objectives | by college/division objectives |
| by college | by regional accreditor objectives | by regional accreditor objectives |
| by regional accreditor | by institution objectives | by institution objectives |
| by institution | by state objectives | by state objectives |
| by state | by federal objectives | by federal objectives |
| by federal | | |

Assessment Tools Reporting

| Listing of types of assessment tools | Listing of types of assessment tools by course and/or program | Listing of types of assessment tools by course and/or program outcome |
|---|---|---|
| by course | by program objectives | by program objectives |
| by program | by department objectives | by department objectives |
| by department | by college objectives | by college objectives |
| by college/division | by professional accreditor objectives | by professional accreditor objectives |
| by professional accreditor | by college/division objectives | by college/division objectives |
| by college | by regional accreditor objectives | by regional accreditor objectives |
| by regional accreditor | by institution objectives | by institution objectives |
| by institution | by state objectives | by state objectives |
| by state | by federal objectives | by federal objectives |
| by federal | | |

-continued

Results Reporting

| Listing of types of results | Listing of types of results by course and/or program | Listing of types of results by course and/or program outcome |
| --- | --- | --- |
| by course | by program objectives | by program objectives |
| by program | by department objectives | by department objectives |
| by department | by college objectives | by college objectives |
| by college/division | by professional accreditor objectives | by professional accreditor objectives |
| by professional accreditor | by college/division objectives | by college/division objectives |
| by college | by regional accreditor objectives | by regional accreditor objectives |
| by regional accreditor | by institution objectives | by institution objectives |
| by institution | by state objectives | by state objectives |
| by state | by federal objectives | by federal objectives |
| by federal | | |

Decisions/Recommendations Reporting

| Listing of types of decisions/ recommendations | Listing of types of decisions/ recommendations by course and/or program | Listing of types of decisions/ recommendations by course and/or program outcome |
| --- | --- | --- |
| by course | by program objectives | by program objectives |
| by program | by department objectives | by department objectives |
| by department | by college objectives | by college objectives |
| by college/division | by professional accreditor objectives | by professional accreditor objectives |
| by professional accreditor | by college/division objectives | by college/division objectives |
| by college | by regional accreditor objectives | by regional accreditor objectives |
| by regional accreditor | by institution objectives | by institution objectives |
| by institution | by state objectives | by state objectives |
| by state | by federal objectives | by federal objectives |
| by federal | | |

Criteria Ranking of Outcomes Reporting

| Listing of types of criteria rankings | Listing of types of criteria rankings by course and/or program | Listing of types of criteria rankings by course and/or program outcome |
| --- | --- | --- |
| by course | by program objectives | by program objectives |
| by program | by department objectives | by department objectives |
| by department | by college objectives | by college objectives |
| by college/division | by professional accreditor objectives | by professional accreditor objectives |
| by professional accreditor | by college/division objectives | by college/division objectives |
| by college | by regional accreditor objectives | by regional accreditor objectives |
| by regional accreditor | by institution objectives | by institution objectives |
| by institution | by state objectives | by state objectives |
| by state | by federal objectives | by federal objectives |
| by federal | | |

Table 4 illustrates crosswalks and relationship tables that may be provided according to various embodiments of the present invention. The crosswalks provide forced choice responses in the drop down boxes. In some embodiments, when the faculty member selects his/her choice—the code that will be stored and summarized for the report writing is the code listed on the right hand side. However, the word listed on the report will be the words on the left hand side. Those are also the words that will appear in the drop down box for the faculty to select

TABLE 4

| | Codes in Formats Used for Reporting | |
| --- | --- | --- |
| What type of standard is this? | | |
| Long-term | Long Range | 1 |
| Short-term | Short Range | 2 |
| Assessment Role | | |
| Documenting Only | Document | 1 |
| Decision-Making Team Member | Decision | 2 |
| Write Objectives | Objectives | 3 |
| Write Outcomes | Outcomes | 4 |
| Select Evaluation Methods | Evaluation | 5 |

TABLE 4-continued

| | Codes in Formats Used for Reporting | |
|---|---|---|
| External Evaluation Selection | External Review | 6 |
| Data Analysis Team | Analysis | 7 |
| Survey Design | Survey | 8 |
| Write Rubric | Rubric | 9 |
| Document Criteria | Criteria | 10 |
| Internal Objective Reviewer | Reviewer | 11 |
| Coordinate Classroom Assessment | Classroom | 12 |
| Assessment Committee Chair | Chair | 13 |
| Involved in Entire Process | Whole Process | 14 |
| Name of your State System | | |
| Alabama State System | Use Accepted State 2 Letter Abbreviations | |
| Alaska State System | AL | 1 |
| Arizona State System | etc | 2 |
| Arkansas State System | | 3 |
| California State System | | 4 |
| Colorado State System | | 5 |
| Connecticut State System | | 6 |
| Delaware State System | | 7 |
| Florida State System | | 8 |
| Georgia State System | | 9 |
| Hawaii State System | | 10 |
| Idaho State System | | 11 |
| Illinois State System | | 12 |
| Indiana State System | | 13 |
| Iowa State System | | 14 |
| Kansas State System | | 15 |
| Kentucky State System | | 16 |
| Louisiana State System | | 17 |
| Maine State System | | 18 |
| Maryland State System | | 19 |
| Massachusetts State System | | 20 |
| Michigan State System | | 21 |
| Minnesota State System | | 22 |
| Mississippi State System | | 23 |
| Missouri State System | | 24 |
| Montana State System | | 25 |
| Nebraska State System | | 26 |
| Nevada State System | | 27 |
| New Hampshire State System | | 28 |
| New Jersey State System | | 29 |
| New Mexico State System | | 30 |
| New York State System | | 31 |
| North Carolina State System | | 32 |
| North Dakota State System | | 33 |
| Ohio State System | | 34 |
| Oklahoma State System | | 35 |
| Oregon State System | | 36 |
| Pennsylvania State System | | 37 |
| Rhode Island State System | | 38 |
| South Carolina State System | | 39 |
| South Dakota State System | | 40 |
| Tennessee State System | | 41 |
| Texas State System | | 42 |
| Utah State System | | 43 |
| Vermont State System | | 44 |
| Virginia State System | | 45 |
| Washington State System | | 46 |
| Washington, DC State System | | 47 |
| West Virginia State System | | 48 |
| Wisconsin State System | | 49 |
| Wyoming State System | | 50 |
| Alabama Community College System | ALCC | 51 |
| Alaska Community College System | etc | 52 |
| Arizona Community College System | | 53 |
| Arkansas Community College System | | 54 |
| California Community College System | | 55 |
| Colorado Community College System | | 56 |
| Connecticut Community College System | | 57 |
| Delaware Community College System | | 58 |
| Florida Community College System | | 59 |
| Georgia Community College System | | 60 |
| Hawaii Community College System | | 61 |
| Idaho Community College System | | 62 |
| Illinois Community College System | | 63 |
| Indiana Community College System | | 64 |
| Iowa Community College System | | 65 |

TABLE 4-continued

| | Codes in Formats Used for Reporting | |
|---|---|---|
| Kansas Community College System | | 66 |
| Kentucky Community College System | | 67 |
| Louisiana Community College System | | 68 |
| Maine Community College System | | 69 |
| Maryland Community College System | | 70 |
| Massachusetts Community College System | | 71 |
| Michigan Community College System | | 72 |
| Minnesota Community College System | | 73 |
| Mississippi Community College System | | 74 |
| Missouri Community College System | | 75 |
| Montana Community College System | | 76 |
| Nebraska Community College System | | 77 |
| Nevada Community College System | | 78 |
| New Hampshire Community College System | | 79 |
| New Jersey Community College System | | 80 |
| New Mexico Community College System | | 81 |
| New York Community College System | | 82 |
| North Carolina Community College System | | 83 |
| North Dakota Community College System | | 84 |
| Ohio Community College System | | 85 |
| Oklahoma Community College System | | 86 |
| Oregon Community College System | | 87 |
| Pennsylvania Community College System | | 88 |
| Rhode Island Community College System | | 89 |
| South Carolina Community College System | | 90 |
| South Dakota Community College System | | 91 |
| Tennessee Community College System | | 92 |
| Texas Community College System | | 93 |
| Utah Community College System | | 94 |
| Vermont Community College System | | 95 |
| Virginia Community College System | | 96 |
| Washington Community College System | | 97 |
| Washington, DC Community College System | | 98 |
| West Virginia Community College System | | 99 |
| Wisconsin Community College System | | 100 |
| Wyoming Community College System | | 101 |
| Institution Basics | | |
| | | |
| Name of your institution | Use IPEDS Code Numbers | |
| Appalachian State University | | |
| East Carolina University | | |
| Elizabeth City State University | | |
| Fayetteville State University | | |
| North Carolina Agricultural & Technical State University | | |
| North Carolina Central University | | |
| North Carolina School of the Arts | | |
| North Carolina State University | | |
| University of North Carolina at Asheville | | |
| University of North Carolina at Chapel Hill | | |
| University of North Carolina at Charlotte | | |
| University of North Carolina at Greensboro | | |
| University of North Carolina at Pembroke | | |
| University of North Carolina at Wilmington | | |
| Western Carolina University | | |
| Winston Salem State University | | |
| Professional Accreditation Basics | | |
| | | |
| Name of Accreditor | Use | |
| Southern Association of Colleges and Schools (SACS) | SACS | 1 |
| Middle States Commission on Higher Education (CHE) | CHE | 2 |
| New England Association of Schools and Colleges (NEAS&C) | NEAC&C | 3 |
| The Higher Learning Commission (HLC) | HLC | 4 |
| Commission on Colleges and Universities of the Northwest Association of Schools and Colleges | NWA | 5 |
| Western Association of Schools and Colleges (WASC) | WASC | 6 |
| Name of your college/division | Use institutional research numerical reporting codes | |
| Agriculture and Life Sciences | | |
| Design | | |
| Education | | |
| Engineering | | |
| First Year College | | |
| Graduate School | | |
| Humanities and Social Sciences | | |
| Management | | |
| Natural Resources | | |
| Physical and Mathematical Sciences | | |

TABLE 4-continued

|  | Codes in Formats Used for Reporting |
|---|---|
| Textiles | |
| Veterinary Medicine | |
| Name of your department | Use institutional research numerical reporting codes |
| Accounting | |
| Adult & Community College Education | |
| Agricultural & Extension Education | |
| Agricultural & Resource Economics | |
| Air Force ROTC | |
| Animal Science | |
| Applied Sociology | |
| Architecture | |
| Army ROTC | |
| Biochemistry | |
| Biological & Agricultural Engineering | |
| Biological Sciences | |
| Botany | |
| Business Management | |
| Chemical Engineering | |
| Chemistry | |
| Civil Engineering | |
| Clinical Sciences | |
| Communication | |
| Computer Science | |
| Counselor Education | |
| Crop Science | |
| Curriculum & Instruction | |
| Design & Technology | |
| Economics | |
| Electrical & Computer Engineering | |
| English | |
| Entomology | |
| Environmental & Molecular Toxicology | |
| Family & Consumer Sciences | |
| Farm Animal Health & Resource Management | |
| Food Science | |
| Foreign Languages & Literatures | |
| Forestry | |
| 4-H Youth Development | |
| Genetics | |
| Graphic Design | |
| History | |
| Horticultural Science | |
| Industrial Engineering | |
| Landscape Architecture | |
| Marine, Earth & Atmospheric Sciences | |
| Mathematics | |
| Mathematics, Science & Technology Education | |
| Materials Science & Engineering | |
| Mechanical & Aerospace Engineering | |
| Microbiology | |
| Molecular Biomedical Sciences | |
| Multidisciplinary Studies | |
| Music | |
| Natural Resources | |
| Navy ROTC | |
| Nuclear Engineering | |
| Nutrition | |
| Parks, Recreation, & Tourism Management | |
| Philosophy & Religion | |
| Physical Education | |
| Physics | |
| Plant Pathology | |
| Political Science & Public Administration | |
| Poultry Science | |
| Psychology | |
| Social Work | |
| Sociology & Anthropology | |
| Soil Science | |
| Statistics | |
| Textile & Apparel Technology & Management | |
| Textile Engineering, Chemistry & Science | |
| Wood & Paper Science | |
| Zoology | |
| Evaluation Methods and Assessment Tools | Same as listed in left column |
| Activities selected or elected by students | 1 |
| Alumni Surveys | 2 |
| Capstone projects | 3 |

TABLE 4-continued

| | Codes in Formats Used for Reporting | |
|---|---|---|
| CAS Standards | | 4 |
| Case studies | | 5 |
| Collections of student work (e.g. Portfolios) | | 6 |
| Course-embedded assessment | | 7 |
| Criteria checklists | | 8 |
| Diversity of student body | | 9 |
| Document analysis | | 10 |
| Employer Surveys | | 11 |
| Essay tests blind scored across units | | 12 |
| Essays | | 13 |
| Evaluations of performance | | 14 |
| Exit Interviews with Graduates | | 15 |
| External juried review of student projects | | 16 |
| Externally reviewed internship | | 17 |
| Faculty/Student ratios | | 18 |
| Focus groups | | 19 |
| Grade point averages | | 20 |
| Graduate Follow-up Studies | | 21 |
| Graduation rates | | 22 |
| Internal juried review of student projects | | 23 |
| Interviews | | 24 |
| Job Placement Statistics | | 25 |
| Local surveys | | 26 |
| Locally developed tests | | 27 |
| Longitudinal studies | | 28 |
| National standardized surveys | | 29 |
| Observations | | 30 |
| Observations of student behavior | | 31 |
| One-on-one meeting notes | | 32 |
| Percentage of students who go on to graduate school | | 33 |
| Percentage of students who graduate within five–six years | | 34 |
| Percentage of students who study abroad | | 35 |
| Performance on a case study/problem | | 36 |
| Performance on national licensure examinations | | 37 |
| Performance on problem and analysis (Student explains how he or she solved a problem) | | 38 |
| Persistence rates | | 39 |
| Portfolios | | 40 |
| Pre-and post-tests | | 41 |
| Retention and Transfer Studies | | 42 |
| Rubrics | | 43 |
| Standardized tests | | 44 |
| Student Surveys | | 45 |
| Student work samples | | 46 |
| Other | | 47 |
| Who is the audience being assessed? | Same as listed in left column | |
| Administration | | 1 |
| Faculty | | 2 |
| Staff | | 3 |
| Graduate students | | 4 |
| Undergraduate students | | 5 |
| Alumni | | 6 |
| Parents | | 7 |
| Other | | 8 |
| Who will administer it? | Same as listed in left column | |
| Full time assessment professional | | 1 |
| Full time professional | | 2 |
| Graduate Assistant | | 3 |
| Partnership with another division for assessment support | | 4 |
| No staff support for assessment | | 5 |
| Other | | 6 |
| Not Applicable | | 7 |
| Could this finding be considered a strength, weakness, or neutral? | Same as listed in left column | |
| Strength | | 1 |
| Weakness | | 2 |
| Neutral | | |
| Criteria Ranking System | | |
| Excellent to Poor | | |
| | Excellent | 5 |
| | Good | 4 |
| | Average | 3 |
| | Poor | 2 |
| | N/A | 1 |

TABLE 4-continued

|  | Codes in Formats Used for Reporting | |
|---|---|---|
| Exemplary to Beginning | | |
| | Exemplary | 5 |
| | Achieving | 4 |
| | Developing | 3 |
| | Beginning | 2 |
| | N/A | 1 |
| One through Five | | |
| | 5 | 5 |
| | 4 | 4 |
| | 3 | 3 |
| | 2 | 2 |
| | N/A | 1 |
| Grades A–D | | |
| | A | 5 |
| | B | 4 |
| | C | 3 |
| | D | 2 |
| | N/A | 1 |
| Observations | | |
| Re-ordering sequences of courses | | 1 |
| Adding new components to existing courses | | 2 |
| Deleting courses | | 3 |
| Refining certain components in courses | | 4 |
| Adding capstone courses or program portfolios | | 5 |
| Maintaining status quo | | 6 |
| Recommending additional research and evaluation as it was unclear what decisions should be made because of unclear evidence | | 7 |
| Refining evaluation methods | | 8 |
| Refining implementation of assessment process | | 9 |
| Refining criteria used in evaluation | | 10 |
| Objectives and Outcomes | | |
| Still Incomplete | | |
| Analytical reasoning | | 1 |
| Demonstrating leadership | | 2 |
| Working with disciplinary teams | | 3 |
| Adaptation abilities | | 4 |
| Advertising/stating professional skills and abilities | | 5 |
| Character identification | | 6 |
| Collaboration | | 7 |
| Competing for entry-level jobs | | 8 |
| Competing for graduate school admission | | 9 |
| Comprehension and negotiation of group dynamics | | 10 |
| Conducting research | | 11 |
| Conflict resolution | | 12 |
| Consequences of behavior | | 13 |
| Context complexity | | 14 |
| Critical review of professional literature | | 15 |
| Critical thinking | | 16 |
| Data management | | 17 |
| Demonstrating professional activities/behavior | | 18 |
| Emotional intelligence | | 19 |
| Empathy | | 20 |
| Ethical researching | | 21 |
| Finding information | | 22 |
| General skills for employment/graduate studies | | 23 |
| Healthy relationships | | 24 |
| Identification of credible research resources | | 25 |
| Identify development | | 26 |
| Information gathering | | 27 |
| Information sharing (communication and presentation) | | 28 |
| Informed decision-making | | 29 |
| Intercultural competencies | | 30 |
| Interpersonal communication | | 31 |
| Knowledge and application of ethical implications of profession | | 32 |
| Knowledge and application of professional code of conduct | | 33 |
| Knowledge of contemporary issues | | 34 |
| Leadership evaluation | | 3 |
| Listening | | 36 |
| Location of credible and valid research resources | | 37 |
| Meaning making | | 38 |

TABLE 4-continued

| | Codes in Formats Used for Reporting |
|---|---|
| Moral reasoning | 39 |
| Oral communication | 40 |
| Organization | 41 |
| Participation in professional development activities | 42 |
| Participation in professional improvement activities | 43 |
| Participation in professional organizations | 44 |
| Personal responsibility for decisions | 45 |
| Planning | 46 |
| Problem analysis | 47 |
| Problem solving | 48 |
| Recognition of diverse ability and learning styles | 49 |
| Recognition of diverse ideas and cultural context | 50 |
| Recognition of diverse people | 51 |
| Reflection | 52 |
| Safety | 53 |
| Seeking assistance | 54 |
| Social development | 55 |
| Specific academic discipline Knowledge | 56 |
| Specific program knowledge | 57 |
| Technological literacy | 58 |
| Time management | 59 |
| Visual/Graphic communication | 60 |
| Wellness | 61 |
| Working with interdisciplinary/multidisciplinary teams | 62 |
| Written communication | 63 |

Accordingly, embodiments of the present invention can provide technology to make evaluating student learning and development meaningful to both the expert measuring the intended result and the decision maker trying to inform policy. Students at all grade levels from K-12 to college and post-college may be evaluated. As was described above, embodiments of the present invention can assist with mapping student learning to values that are meaningful to instructors, specialists, and institutional, state and federal administrators. Through technological mapping of values, which may be articulated as intended outcomes, and gathering of meaningful data that can be linked to higher administrative-level standards and used to inform decisions and recommendations for continuous improvement, expert-driven assessment can inform significant decision making, including state and national policies. Moreover, embodiments of the present invention may be applied to assessment in fields other than in education, such as quality control assessment in manufacturing and service industries.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of standardizing educational assessment comprising:

capturing educational assessment methodologies as free-form text that describes the educational assessment methodologies and keywords that are derived from the free-form text that describes the educational assessment methodologies and are selected from a common set of keywords;

capturing educational assessment observations as free-form text that describes the educational assessment observations, keywords that are derived from the free-form text that describes the educational assessment observations and are selected from the common set of keywords and rankings, in response to input from an education expert who delivers an educational program that is related to the educational assessment observations;

normalizing the rankings; and generating educational assessment reports from the normalized rankings and the keywords that are derived from the free-form text that describes the educational assessment methodologies and the educational assessment observations.

2. A method according to claim 1:

wherein capturing educational assessment observations comprises observing outcomes of education delivery in terms of the educational assessment observations; and wherein generating educational assessment reports comprises generating educational assessment reports from the outcomes that are observed, the normalized rankings and the keywords that are derived from the free-form text that describes the educational assessment methodologies and the educational assessment observations.

3. A method according to claim 1 wherein capturing educational assessment methodologies as free-form text and keywords comprises:

capturing educational assessment methodologies by a plurality of educational assessment institutions as free-form text and a plurality of keywords that are derived from the free-form text that describes the educational assessment methodologies and are selected from a common set of keywords that are used by the plurality of educational assessment institutions.

4. A method according to claim 3 wherein the plurality of educational assessment institutions comprise at least one education delivery institution and at least one government institution.

5. A method according to claim 3 wherein generating educational assessment reports comprises:

generating educational assessment reports for the plurality of educational assessment institutions from the normalized rankings and the the keywords that are derived from the free-form text that describes the educational assessment methodologies and the educational assessment observations.

6. A method according to claim 3 wherein capturing educational assessment observations comprises:
capturing educational assessment observations as free-form text that describes the education assessment observations, keywords that are derived form the free-form text that describes the education assessment observations and are selected from the common set of keywords and rankings that are used by the plurality of educational assessment institutions.

7. A method according to claim 1 wherein capturing educational assessment observations comprises capturing educational assessment observations as free-form text that describes the educational assessment observations in response to input from the education expert who delivers the educational program that is related to the educational assessment observations and keywords that are selected from the common set of keywords that are generated by an educational administrator.

8. A method according to claim 1 further comprising capturing educational assessment decisions that result from the educational assessment observations as free-form text that describes the educational assessment decisions and keywords that are derived from the free-form text that describes the educational assessment decisions and are selected from the common set of keywords, in response to input from the education expert.

9. A method of standardizing project assessment comprising:
capturing project assessment methodologies as free-form text that describes the project assessment methodologies and keywords that are derived from the free-form text that describes the project assessment methodologies and are selected from a set of common keywords;
capturing project assessment observations as free-form text that describes the project assessment observations, keywords that are derived from the free-form text that describes the project assessment observations and are selected from the set of common keywords and rankings, in response to input from a project expert who delivers a project program that is related to the project assessment observations;
normalizing the rankings; and
generating project assessment reports from the normalized rankings and the keywords that are derived from the free-form text that describes the project assessment methodologies and the project assessment observations.

10. A method according to claim 9:
wherein capturing project assessment observations comprises observing outcomes of project performance in terms of the assessment observations; and
wherein generating project assessment reports comprises generating project assessment reports from the outcomes that are observed, the normalized rankings and the keywords that are derived from the free-form text that describes the project assessment methodologies and the project assessment observations.

11. A method according to claim 9 wherein capturing project assessment methodologies as free-form text and keywords comprises:
capturing project assessment methodologies by a plurality of project assessment institutions as free-form text and a plurality of keywords that are derived from the free-form text that describes the project assessment methodologies and are selected from a set of common keywords that are used by the plurality of project assessment institutions.

12. A method according to claim 11 wherein the plurality of project assessment institutions comprise at least one project delivery institution and at least one project monitoring institution.

13. A method according to claim 11 wherein generating project assessment reports comprises:
generating project assessment reports for the plurality of project assessment institutions from the normalized rankings and the keywords that are derived from the free-form text that describes the project assessment methodologies and the project assessment observations.

14. A method according to claim 11 wherein capturing project assessment observations comprises:
capturing project assessment observations as free-form text that describes the project assessment observations, keywords that are derived from the free-form text that describes the project assessment observations and are selected from the set of common keywords and rankings that are used by the plurality of project assessment institutions.

15. A method according to claim 9 wherein capturing project assessment observations comprises capturing project assessment observations as free-form text that describes the project assessment observations in response to input from the project expert who delivers the project program that is related to the project assessment observations and keywords that are selected from the common set of keywords that are generated by a project administrator.

16. A method according to claim 9 further comprising capturing project assessment decisions that result from the project assessment observations as free-form text that describes the project assessment decisions and keywords that are derived form the free-form text that describes the project assessment decisions and are selected from the common set of keywords, in response to input from the project expert.

17. A system for standardizing educational assessment comprising:
means for capturing educational assessment methodologies as free-form text that describes the educational assessment methodologies and keywords that are derived from the free-form text that describes the educational assessment methodologies and are selected from a common set of keywords;
means for capturing educational assessment observations as free-form text that describes the educational assessment observations, keywords that are derived from the free-form text that describes the educational assessment observations and are selected from the common set of keywords and rankings, in response to input from an education expert who delivers an educational program that is related to the educational assessment observations;
means for normalizing the rankings; and
means for generating educational assessment reports from the normalized rankings and the keywords that are derived from the free-form text that describes the educational assessment methodologies and the educational assessment observations.

18. A system according to claim 17:
wherein the means for capturing educational assessment observations comprises means for observing outcomes of education delivery in terms of the educational assessment observations; and wherein the means for generating educational assessment reports comprises means for generating educational assessment reports from the outcomes that are observed, the normalized rankings and the keywords that are derived from the free-form text that describes the educational assessment methodologies and the educational assessment observations.

19. A system according to claim 17 wherein the means for capturing educational assessment methodologies as free-form text and keywords comprises:

means for capturing educational assessment methodologies by a plurality of educational assessment institutions as free-form text and a plurality of keywords that are derived from the free-form text that describes the educational assessment methodologies and are selected from a common set of keywords that are used by the plurality of educational assessment institutions.

20. A system according to claim 19 wherein the plurality of educational assessment institutions comprise at least one education delivery institution and at least one government institution.

21. A system according to claim 19 wherein the means for generating educational assessment reports comprises:

means for generating educational assessment reports for the plurality of educational assessment institutions from the normalized rankings and the the keywords that are derived from the free-form text that describes the educational assessment methodologies and the educational assessment observations.

22. A system according to claim 19 wherein the means for capturing educational assessment observations comprises:

means for capturing educational assessment observations as free-form text that describes the education assessment observations, keywords that are derived from the free-form text that describes the educational assessment observations and are selected from the common set of keywords and rankings that are used by the plurality of educational assessment institutions.

23. A system according to claim 17 wherein the means for capturing educational assessment observations comprises means for capturing educational assessment observations as free-form text that describes the educational assessment observations in response to input from the education expert who delivers the educational program that is related to the educational assessment observations and keywords that are selected from the common set of keywords that are generated by an educational administrator.

24. A system according to claim 17 further comprising means for capturing educational assessment decisions that result from the educational assessment observations as free-form text that describes the educational assessment decisions and keywords that are derived from the free-form text that describes the educational assessment decisions and are selected from the common set of keywords, in response to input from the education expert.

25. A system of standardizing project assessment comprising:

means for capturing project assessment methodologies as free-form text that describes the project assessment methodologies and keywords that are derived from the free-form text that describes the project assessment methodologies and are selected from a set of common keywords;

means for capturing project assessment observations as free-form text that describes the project assessment observations, keywords that are derived from the free-form text that describes the project assessment observations and are selected from the set of common keywords and rankings, in response to input from a project expert who delivers a project program that is related to the project assessment observations;

means for normalizing the rankings; and means for generating project assessment reports from the normalized rankings and the keywords that are derived from the free-form text that describes the project assessment methodologies and the project assessment observations.

26. A system according to claim 25:

wherein the means for capturing project assessment observations comprises means for observing outcomes of project performance in terms of the assessment observations; and wherein the means for generating project assessment reports comprises means for generating project assessment reports from the outcomes that are observed, the normalized rankings and the keywords that are derived from the free-form text that describes the project assessment methodologies and the project assessment observations.

27. A system according to claim 25 wherein the means for capturing project assessment methodologies as free-form text and keywords comprises:

means for capturing project assessment methodologies by a plurality of project assessment institutions as free-form text and a plurality of keywords that are derived from the free-form text that describes the project assessment methodologies and are selected from a set of common keywords that are used by the plurality of project assessment institutions.

28. A system according to claim 27 wherein the plurality of project assessment institutions comprise at least one project delivery institution and at least one project monitoring institution.

29. A system according to claim 27 wherein the means for generating project assessment reports comprises:

means for generating project assessment reports for the plurality of project assessment institutions from the normalized rankings and the keywords that are derived from the free-form text that describes the project assessment methodologies and the project assessment observations.

30. A system according to claim 27 wherein the means for capturing project assessment observations comprises:

means for capturing project assessment observations as free-form text that describes the project assessment observations, keywords that are derived from the free-form text that describes the project assessment observations and are selected from the set of common keywords and rankings that are used by the plurality of project assessment institutions.

31. A system according to claim 25 wherein the means for capturing project assessment observations comprises means for capturing project assessment observations as free-form text that describes the project assessment observations in response to input from the project expert who delivers the project program that is related to the project assessment observations and keywords that are selected from the common set of keywords that are generated by a project administrator.

32. A system according to claim 25 further comprising means for capturing project assessment decisions that result from the project assessment observations as free-form text that describes the project assessment decisions and keywords that are derived from the free-form text that describes the project assessment decisions and are selected from the common set of keywords, in response to input from the project expert.

33. A computer program product that is configured to standardize educational assessment, the computer program product comprising a computer usable storage medium having computer-readable program code embodied in the medium, the computer-readable program code comprising:
computer-readable program code that is configured to capture educational assessment methodologies as free-form text that describes the educational assessment methodologies and keywords that are derived from the free-form text that describes the educational assessment methodologies and are selected from a common set of keywords;
computer-readable program code that is configured to capture educational assessment observations as free-form text that describes the educational assessment observations, keywords that are derived from the free-form text that describes the educational assessment observations and are selected from the common set of keywords and rankings, in response to input from an education expert who delivers an educational program that is related to the educational assessment observations;
computer-readable program code that is configured to normalize the rankings; and
computer-readable program code that is configured to generate educational assessment reports from the normalized rankings and the keywords that are derived from the free-form text that describes the educational assessment methodologies and the educational assessment observations.

34. A computer program product according to claim 33:
wherein the computer-readable program code that is configured to capture educational assessment observations comprises computer-readable program code that is configured to observe outcomes of education delivery in terms of the educational assessment observations; and
wherein the computer-readable program code that is configured to generate educational assessment reports comprises computer-readable program code that is configured to generate educational assessment reports from the outcomes that are observed, the normalized rankings and the keywords that are derived from the free-form text that describes the educational assessment methodologies and the educational assessment observations.

35. A computer program product according to claim 33 wherein the computer-readable program code that is configured to capture educational assessment methodologies as free-form text and keywords comprises:
computer-readable program code that is configured to capture educational assessment methodologies by a plurality of educational assessment institutions as free-form text and a plurality of keywords that are derived from the free-form text that describes the educational assessment methodologies and are selected from a common set of keywords that are used by the plurality of educational assessment institutions.

36. A computer program product according to claim 35 wherein the plurality of educational assessment institutions comprise at least one education delivery institution and at least one government institution.

37. A computer program product according to claim 35 wherein the computer-readable program code that is configured to generate educational assessment reports comprises:
computer-readable program code that is configured to generate educational assessment reports for the plurality of educational assessment institutions from the normalized rankings and the keywords that are derived from the free-form text that describes the educational assessment methodologies and the educational assessment observations.

38. A computer program product according to claim 35 wherein the computer-readable program code that is configured to capture educational assessment observations comprises:
computer-readable program code that is configured to capture educational assessment observations as free-form text that describes the educational assessment observations, keywords that are derived form the free-form text that describes the educational assessment observations and are selected from the common set of keywords and rankings that are used by the plurality of educational assessment institutions.

39. A computer program product according to claim 33 wherein the computer-readable program code that is configured to capture educational assessment observations comprises computer-readable program code that is configured to capture educational assessment observations as free-form text that describes the educational assessment observations in response to input from the education expert who delivers the educational program that is related to the educational assessment observations and keywords that are selected from the common set of keywords that are generated by an educational administrator.

40. A computer program product according to claim 33 further comprising computer-readable program code that is configured to capture educational assessment decisions that result from the educational assessment observations as free-form text that describes the educational assessment decisions and keywords that are derived from the free-form text that describes the educational assessment decisions and are selected from the common set of keywords, in response to input from the education expert.

41. A computer program product that is configured to standardize project assessment, the computer program product comprising a computer usable storage medium having computer-readable program code embodied in the medium, the computer-readable program code comprising:
computer-readable program code that is configured to capture project assessment methodologies as free-form text that describes the project assessment methodologies and keywords that are derived from the free-form text that describes the project assessment methodologies and are selected from a set of common keywords;
computer-readable program code that is configured to capture project assessment observations as free-form text that describes the project assessment observations, keywords that are derived from the free-form text that describes the project assessment observations and are selected from the set of common keywords and rankings, in response to input from a project expert who delivers a project program that is related to the project assessment observations;
computer-readable program code that is configured to normalize the rankings; and
computer-readable program code that is configured to generate project assessment reports from the normalized rankings and the keywords that are derived from the free-form text that describes the project assessment methodologies and the project assessment observations.

42. A computer program product according to claim 41:
wherein the computer-readable program code that is configured to capture project assessment observations comprises computer-readable program code that is configured to observe outcomes of project performance in terms of the assessment observations; and
wherein the computer-readable program code that is configured to generate project assessment reports comprises generating project assessment reports from the outcomes that are observed, the normalized rankings and the keywords that are derived from the free-form text that describes the project assessment methodologies and the project assessment observations.

43. A computer program product according to claim 41 wherein the computer-readable program code that is configured to capture project assessment methodologies as free-form text and keywords comprises:
computer-readable program code that is configured to capture project assessment methodologies by a plurality of project assessment institutions as text and a plurality of keywords that are derived from the free-form text that describes the project assessment methodologies and are selected from a set of common keywords that are used by the plurality of project assessment institutions.

44. A computer program product according to claim 43 wherein the plurality of project assessment institutions comprise at least one project delivery institution and at least one project monitoring institution.

45. A computer program product according to claim 43 wherein the computer-readable program code that is configured to generate project assessment reports comprises:
computer-readable program code that is configured to generate project assessment reports for the plurality of project assessment institutions from the normalized rankings and the keywords that are derived from the free-form text that describes the project assessment methodologies and the project assessment observations.

46. A computer program product according to claim 43 wherein the computer-readable program code that is configured to capture project assessment observations comprises:
computer-readable program code that is configured to capture project assessment observations as free-form text that describes the project assessment observations, keywords that are derived from the free-form text that describes the project assessment observations and are selected from the set of common keywords and rankings that are used by the plurality of project assessment institutions.

47. A computer program product according to claim 41 wherein the computer-readable program code that is configured to capture project assessment observations comprises computer-readable program code that is configured to capture project assessment observations as free-form text that describes the project assessment observations in response to input from the project expert who delivers the project program that is related to the project assessment observations and keywords that are selected from the common set of keywords that are generated by a project administrator.

48. A computer program product according to claim 41 further comprising computer-readable program code that is configured to capture project assessment decisions that result from the project assessment observations as free-form text that describes the project assessment decisions and keywords that are derived from the free-form text that describes the project assessment decisions and are selected from the common set of keywords, in response to input from the project expert.

* * * * *

UNITED STATES PATENT AND TRADEMARK OFFICE
CERTIFICATE OF CORRECTION

PATENT NO. : 7,266,340 B2 Page 1 of 1
APPLICATION NO. : 10/993321
DATED : September 4, 2007
INVENTOR(S) : Bresciani It is certified that error appears in the above-identified patent and that said Letters Patent is hereby corrected as shown below:

<u>In The Claims:</u>

Column 42, Claim 16, Line 37: Please correct "derived form"
To read -- derived from--

Signed and Sealed this

Twenty-seventh Day of November, 2007

JON W. DUDAS
*Director of the United States Patent and Trademark Office*